(12) United States Patent
Chinen et al.

(10) Patent No.: US 9,053,709 B2
(45) Date of Patent: Jun. 9, 2015

(54) CONTROL DEVICE, CONTROL METHOD, AND PROGRAM

(75) Inventors: Toru Chinen, Kanagawa (JP); Yuki Yamamoto, Tokyo (JP); Mitsuyuki Hatanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 885 days.

(21) Appl. No.: 13/147,858

(22) PCT Filed: Dec. 12, 2010

(86) PCT No.: PCT/JP2010/071606
§ 371 (c)(1),
(2), (4) Date: Aug. 4, 2011

(87) PCT Pub. No.: WO2011/070971
PCT Pub. Date: Jun. 16, 2011

(65) Prior Publication Data
US 2011/0295396 A1 Dec. 1, 2011

(30) Foreign Application Priority Data
Dec. 11, 2009 (JP) .................................. 2009-281964

(51) Int. Cl.
*G06F 17/00* (2006.01)
*G10L 25/00* (2013.01)

(52) U.S. Cl.
CPC .......... *G10L 25/00* (2013.01); *G06F 2200/1636* (2013.01)

(58) Field of Classification Search
None
See application file for complete search history.

(56) References Cited

U.S. PATENT DOCUMENTS

2002/0165695 A1  11/2002  Tyson
2008/0159568 A1*  7/2008  Asada et al. .................. 381/150

FOREIGN PATENT DOCUMENTS

| EP | 1762926 A2 | 3/2007 |
|---|---|---|
| EP | 1940195 A2 | 7/2008 |
| JP | 2004-340706 | 12/2004 |
| JP | 2006-323943 | 11/2006 |
| JP | 2008-054103 | 3/2008 |
| JP | 2008-166897 | 7/2008 |

OTHER PUBLICATIONS

European Search Report dated Jul. 4, 2012 in European Patent Application No. 10835892.0.

* cited by examiner

*Primary Examiner* — Fan Tsang
*Assistant Examiner* — David Siegel
(74) *Attorney, Agent, or Firm* — Finnegan, Henderson, Farabow, Garrett & Dunner, L.L.P.

(57) ABSTRACT

The present invention relates to a control device, a control method, and a program capable of improving operability with a simpler configuration.

A reproducing apparatus 11 which reproduces sound such as music includes earphones 21 which are worn by a user on the ears and a body 22. A sound pickup unit 31 collects sounds around the reproducing apparatus 11, and a determination unit 34 extracts future amounts from the collected sound and determines whether the sound corresponds to an operation sound generated when the sound pickup unit 31 is directly tapped by the user. A controller 35 executes a process in accordance with a result of the determination performed by the determination unit 34. For example, when a sound pickup unit 31-1 is tapped once within a predetermined period of time, the controller 35 instructs a reproduction controller 39 to stop reproduction of music. In the reproducing apparatus 11, various function control processes may be performed by a simple operation of tapping the sound pickup unit 31 and buttons are not required. The present invention is applicable to a music player.

17 Claims, 13 Drawing Sheets

FIG. 8

| m | rmsh_high(m) | m | rmsh_high(m) |
|---|---|---|---|
| 0 | 0.000674341 | 16 | 0.001170475 |
| 1 | 0.000740575 | 17 | 0.00101843 |
| 2 | 0.001613782 | 18 | 0.00089693 |
| 3 | 0.127983851 | 19 | 0.000869582 |
| 4 | 0.100977389 | 20 | 0.000837729 |
| 5 | 0.007430781 | 21 | 0.000807203 |
| 6 | 0.004379913 | 22 | 0.000881749 |
| 7 | 0.002643353 | 23 | 0.000783678 |
| 8 | 0.002325689 | 24 | 0.000704581 |
| 9 | 0.001937114 | 25 | 0.00064527 |
| 10 | 0.00161763 | 26 | 0.000638644 |
| 11 | 0.001399698 | 27 | 0.000559669 |
| 12 | 0.001355674 | 28 | 0.000535648 |
| 13 | 0.00143287 | 29 | 0.000525016 |
| 14 | 0.001221994 | 30 | 0.000535541 |
| 15 | 0.001333786 | 31 | 0.000550961 |

FIG. 11

| m | rmsl_low(m) |
|---|---|
| 0 | 0.374824633 |
| 1 | 0.352417358 |
| 2 | 0.070730931 |
| 3 | 0.012500491 | ial
CONTROL DEVICE, CONTROL METHOD, AND PROGRAM

TECHNICAL FIELD

The present invention relates to a control device, a control method, and a program, and particularly relates to a control device, a control method, and a program capable of improving operability with a simpler configuration.

BACKGROUND ART

In recent years, electronic apparatuses having microphones as input devices, such as music players, cellular phones, and IC (Integrated Circuit) recorders, have been widely used. Recently, in such an electronic apparatus, functions of the electronic apparatus such as turning up and down of volume, start and stop of reproduction, and fast-forward and fast-rewind, are controlled by operating buttons and a touch panel.

The electronic apparatus includes a controller which is disposed on a code connecting earphones worn by a user and an electronic apparatus body and which controls reproduction of music performed by the electronic apparatus (refer to Patent Literature 1, for example). In this electronic apparatus, the controller includes a camera. The user may take pictures by operating the controller and the electronic apparatus body.

CITATION LIST

Patent Literature

PTL 1: Japanese Unexamined Patent Application. Publication No. 2003-52089

SUMMARY OF INVENTION

Technical Problem

However, when the electronic apparatus and the controller have a number of functions, a number of buttons should be provided for the functions, and accordingly, a configuration of the electronic apparatus is complicated. Furthermore, when a number of buttons are disposed on the electronic apparatus or the controller, the buttons should be made small and it is difficult to find one of the buttons to be operated resulting in poor operability.

In particular, when the electronic apparatus is used on a train or a bus or while the user is walking on the move, the user should operate buttons by picking up the electronic apparatus body from a bag or a pocket or by looking into the controller. Therefore, when the electronic apparatus provides with a number of buttons, operability is degraded.

The present invention has been made in view of such a situation and improves the operability with a simple configuration.

Solution to Problem

According to an embodiment of the present invention, there is provided a control device including a sound pickup unit which collects a surrounding sound, discrimination means for determining whether the sound pickup unit has been tapped using a maximum value and effective values of the sound collected by the sound pickup unit, and execution means for executing a predetermined process when it is determined that the sound pickup unit has been tapped.

The execution means may specify the number of times the sound pickup unit has been tapped within a predetermined period of time in accordance with a result of the determination performed by the discrimination means and execute a process determined in accordance with the specified number.

The discrimination means may determine whether the sound pickup unit has been tapped in accordance with a result of a threshold-value process performed on the maximum value and a result of a threshold-value process performed on the effective values.

A threshold value used in the threshold-value process performed on the maximum value and a threshold value used in the threshold-value process performed on the effective values may be determined by discriminant analysis or SVM in advance.

The discrimination means may determine that the sound pickup unit has not been tapped when the maximum value of high-frequency components of frequencies higher than a predetermined frequency of the sound is smaller than a first threshold value and determine that the sound pickup unit has not been tapped when the maximum value of low-frequency components of frequencies lower than the high frequency component of the sound.

The discrimination means may determine whether effective values in a plurality of sections obtained by dividing the high-frequency component in a time direction are equal to or smaller than third threshold values determined for individual sections and determines that the sound pickup unit has not been tapped when an effective value of at least one of the sections of the high-frequency component exceeds the third threshold value, and determine whether effective values in a plurality of sections obtained by dividing the low-frequency component in a time direction are equal to or smaller than fourth threshold values determined for individual sections and determines that the sound pickup unit has not been tapped when an effective value of at least one of the sections of the low-frequency component is smaller than the fourth threshold value.

The sections of the high-frequency component may have different lengths, and the sections of the low-frequency component may have different lengths.

The discrimination means may determine whether an absolute value of the high-frequency component at a specific position in the time direction becomes maximum and determine that the sound pickup unit has not been tapped when the absolute value at the specific position does not become maximum.

The discrimination means may determine whether a zero-cross value of the sound is equal to or smaller than a fifth threshold value and determine that the sound pickup unit has not been tapped when the zero-cross value exceeds the fifth threshold value.

The discrimination means may determine whether a linear sum of effective values of sections of the high-frequency component in the time direction is equal to or smaller than a sixth threshold value and determine that the sound pickup unit has not been tapped when the linear sum exceeds the sixth threshold value.

The discrimination means may determine whether a linear sum of effective values of sections of the high-frequency component in the time direction is equal to or smaller than a seventh threshold value and determine that the sound pickup unit has not been tapped when the linear sum exceeds the seventh threshold value.

The discrimination means may determine whether a linear sum of effective values of sections of the low-frequency component in the time direction is equal to or smaller than a eighth threshold value and determine that the sound pickup unit has not been tapped when the linear sum exceeds the eighth threshold value.

The discrimination means may determine whether a linear sum of effective values of sections of the low-frequency component in the time direction is equal to or smaller than a ninth threshold value and determine that the sound pickup unit has not been tapped when the linear sum exceeds the ninth threshold value.

The discrimination means may determine whether a sum of a linear sum of logarithmic values of effective values of sections of the high-frequency component in the time direction and a linear sum of logarithmic values of effective values of sections of the low-frequency component in the time direction is equal to or smaller than a tenth threshold value and determine that the sound pickup unit has not been tapped when the sum exceeds the tenth threshold value.

The execution means may execute a process determined by one of a plurality of the sound pickup units which has been tapped.

According to another embodiment of the present invention, there is provided a control method or a program comprising the steps of collecting a surrounding sound using a sound pickup unit, determining whether the sound pickup unit has been tapped using a maximum value and effective values of the sound collected by the sound pickup unit, and executing a predetermined process when it is determined that the sound pickup unit has been tapped.

According to a further embodiment of the present invention, a sound pickup unit collects a surrounding sound, discrimination means determines whether the sound pickup unit has been tapped using a maximum value and effective values of the sound collected by the sound pickup unit, and execution means executes a predetermined process when it is determined that the sound pickup unit has been tapped.

Advantageous Effects of Invention

According to the present invention, operability is improved with a simpler configuration.

BRIEF DESCRIPTION OF DRAWINGS

FIG. 8 is a diagram illustrating threshold values of the high-frequency effective values.

FIG. 11 is a diagram illustrating threshold values of the low-frequency effective values.

DESCRIPTION OF EMBODIMENTS

Figure 1:
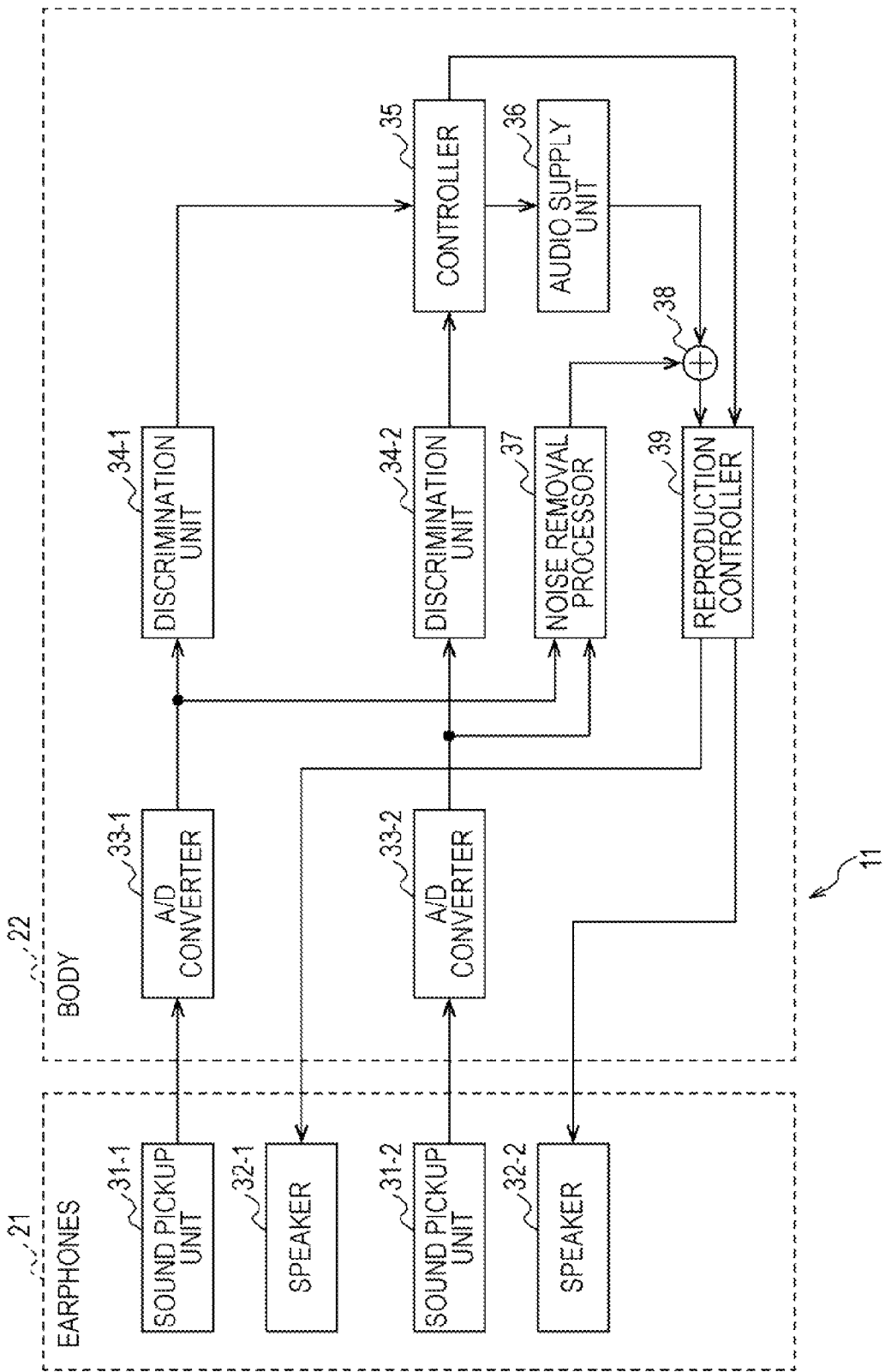
FIG. 1 is a diagram illustrating a configuration of a reproducing apparatus according to an embodiment of the present invention.

Embodiments of the present invention will be described hereinafter with reference to the accompanying drawings.
Configuration of Reproducing Apparatus FIG. 1 is a diagram illustrating a configuration of a reproducing apparatus according to an embodiment of the present invention.

A reproducing apparatus 11 serving as a mobile music player which reproduces sound such as music includes earphones 21 which are worn by a user on user's ears and a body 22 which is connected to the earphones 21 and which is carried by the user.

The earphones 21 include sound pickup units 31-1 and 31-2 and speakers 32-1 and 32-2.

The sound pickup units 31-1 and 31-2 including microphones collect sound around the reproducing apparatus 11 and supply resultant audio signals to the body 22.

The speakers 32-1 and 32-2 reproduce sound in accordance with audio signals representing music, for example, supplied from the body 22.

Note that, when it is not necessary to distinguish the sound pickup units 31-1 and 31-2 from each other, the sound pickup units 31-1 and 31-2 are simply referred to as a sound pickup unit 31. Similarly, when it is not necessary to distinguish the speakers 32-1 and 32-2 from each other, the speakers 32-1 and 32-2 are simply referred to as a speaker 32.

In the reproducing apparatus 11, the sound pickup unit 31 and the speaker 32 integrally constitute earphones which are worn by the user on right and left ears. Then, sound collected by the sound pickup unit 31 and supplied to the body 22 is used for so-called noise cancelling and reproduction control of sound such as music.

Specifically, when the user directly taps the sound pickup unit 31 by a ball of a finger or the like, the body 22 recognizes the tapping operation performed by the user on the sound pickup unit 31 in accordance with a collected sound, and executes a process in accordance with the operation.

The body 22 of the reproducing apparatus 11 includes A/D (Analog/Digital) converters 33-1 and 33-2, discrimination units 34-1 and 34-2, a controller 35, an audio supply unit 36, a noise removal processor 37, an adder 38, and a reproduction controller 39.

The A/D converters 33-1 and 33-2 convert audio signals which are analog signals supplied from the sound pickup units 31-1 and 31-2 into digital signals. The A/D converter 33-1 supplies the audio signal which, has been converted into the digital signal is to the discrimination unit 34-1 and the noise removal processor 37. Meanwhile, the A/D converter 33-2 supplies the audio signal which has been converted into the digital signal to discrimination unit 34-2 and the noise removal processor 37.

The discrimination units 34-1 and 34-2 determine whether the sound pickup unit 31 is directly tapped in accordance with sounds supplied from the A/D converters 33-1 and 33-2, and supply results of the determination to the controller 35. That is, it is determined whether the collected sound corresponds to a sound generated when the user tapped the sound pickup unit 31.

Note that, hereinafter, when it is not necessary to particularly distinguish the A/D converters 33-1 and 33-2 from each other, the A/D converters 33-1 and 33-2 are simply referred to as an A/D converter 33, and when it is not necessary to particularly distinguish the discrimination units 34-1 and 34-2 from each other, the discrimination units 34-1 and 34-2 are simply referred to as a discrimination unit 34.

The controller 35 controls entire operation of the reproducing apparatus 11. For example, the controller 35 instructs the audio supply unit 36 to output sound such as music in accordance with a determination result supplied from the discrimination unit 34 and controls sound reproduced by the reproduction controller 39.

The audio supply unit 36 records data of sound such as music, decodes the sound data in accordance with an instruction issued by the controller 35, and supplies the data to the adder 38. The noise removal processor 37 generates a sound having a phase opposite to that of a sound generated around the reproducing apparatus 11 in accordance with a sound supplied from the A/D converter 33 and supplies the sound to the adder 38.

The adder 38 adds the sound supplied from the noise removal processor 37 to the sound supplied to the audio supply unit 36 and supplies a resultant sound to the reproduction controller 39. The reproduction controller 39 supplies the sound supplied from the adder 38 to the speakers 32-1 and 32-2 in accordance with an instruction issued by the controller 35 and outputs the sound. Since the sound having the phase opposite to that of the collected surrounding sound is added to the sound of the reproduced music, surrounding ambient noise is cancelled and the user hears by the ears only the music.

Configuration of Discrimination Unit

Figure 2:
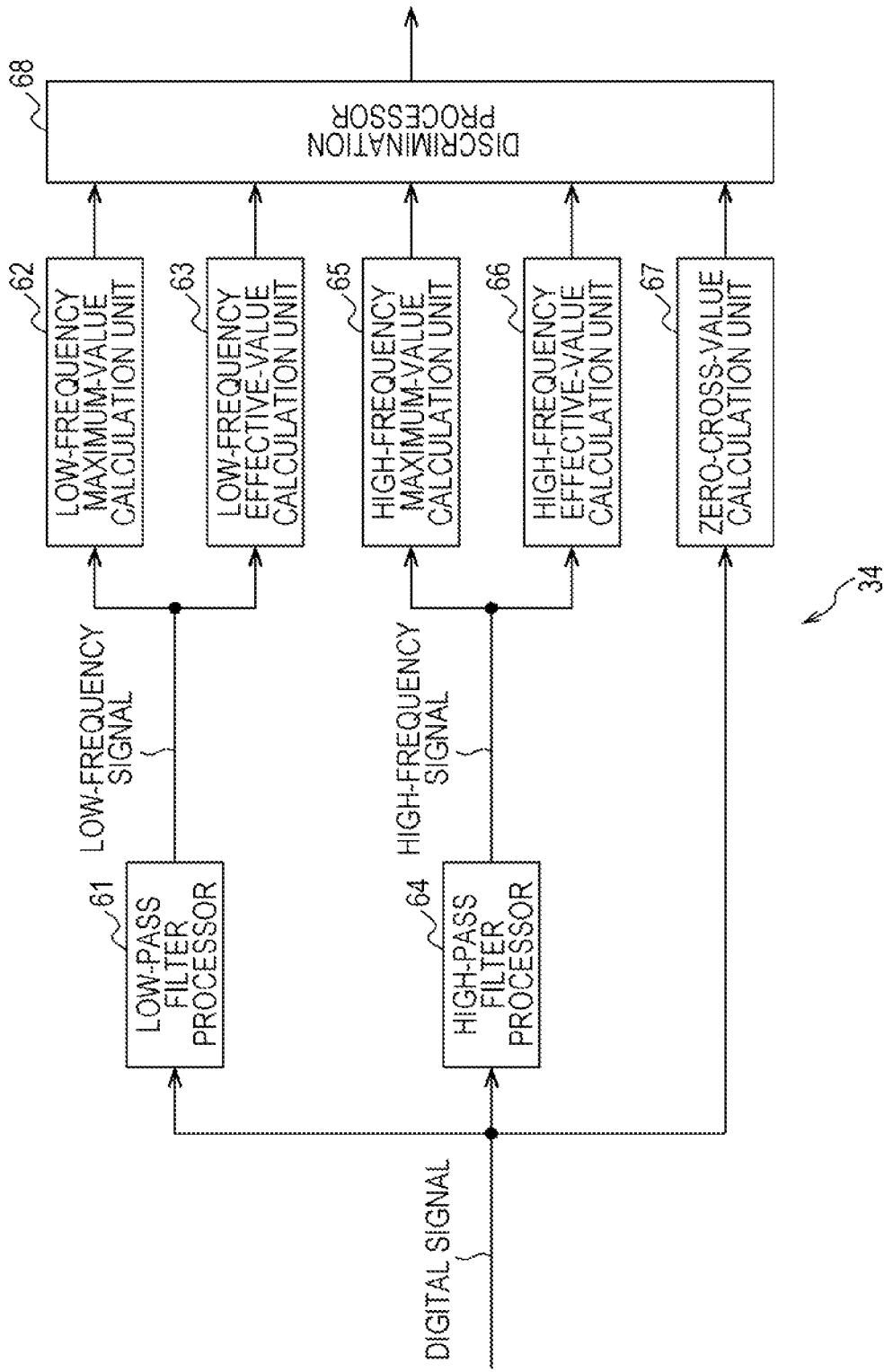
FIG. 2 is a diagram illustrating a configuration of a discrimination unit.

Furthermore, the discrimination unit 34 shown in FIG. 1 is configured as shown in FIG. 2 in detail.

Specifically, the discrimination unit 34 includes a low-pass filter processor 61, a low-frequency maximum-value calculation unit 62, a low-frequency effective-value calculation unit 63, a high-pass filter processor 64, a high-frequency maximum-value calculation unit 65, a high-frequency effective-value calculation unit 66, a zero-cross-value calculation unit 67, and a discrimination processor 68.

The low-pass filter processor 61 performs a filter process on an audio signal supplied from the A/D converter 33 so as to extract low-frequency components and supplies resultant low-frequency signals to the low-frequency maximum-value calculation unit 62 and the low-frequency effective-value calculation unit 63.

The low-frequency maximum-value calculation unit 62 calculates a maximum value (hereinafter also referred to as a "low-frequency maximum value") of low-frequency signals supplied from the low-pass filter processor 61 and supplies the maximum value to the discrimination processor 68. The low-frequency effective-value calculation unit 63 calculates effective values (hereinafter also referred to as "low-frequency effective values") of the low-frequency signals supplied from the low-pass filter processor 61 and supplies the effective values to the discrimination processor 68.

The high-pass filter processor 64 performs a filter process on an audio signal supplied from the A/D converter 33 so as to extract high-frequency components and supplies resultant high-frequency signals to the high-frequency maximum-value calculation unit 65 and the high-frequency effective-value calculation unit 66.

The high-frequency maximum-value calculation unit 65 calculates a maximum value (hereinafter also referred to as a "high-frequency maximum value") of high-frequency signals supplied from the high-pass filter processor 64 and supplies the maximum value to the discrimination processor 68. The high-frequency effective-value calculation unit 66 calculates effective values (hereinafter also referred to as "high-frequency effective values") of the high-frequency signals supplied from the high-pass filter processor 64 and supplies the effective values to the discrimination processor 68.

The zero-cross-value calculation unit 67 calculates zero-cross values of the audio signal supplied from the A/D converter 33 and supplies the zero-cross values to the discrimination processor 68. The discrimination processor 68 identifies the collected sound using the maximum values, the effective values, and the zero-cross values supplied from the low-frequency maximum-value calculation unit 62, the low-frequency effective-value calculation unit 63, the high-frequency maximum-value calculation unit 65, the high-frequency effective-value calculation unit 66, and the zero-cross-value calculation unit 67. That is, the discrimination processor 68 determines whether, the user directly tapped the sound pickup unit 31 and supplies a result of the determination to the controller 35.

Explanation of Reproduction Control Process

Here, when the user operates the reproducing apparatus 11 so as to issue an instruction for reproducing music, the reproducing apparatus 11 starts reproduction of the music. Specifically, the audio supply unit 36 supplies a sound (audio signal) of the specified music to the adder 38 in accordance with an instruction issued by the controller 35. Furthermore, the noise removal processor 37 generates a sound having a phase different from phase of a sound (ambient sound) supplied from the sound pickup unit 31 through the A/D converter 33 using the sound supplied from the sound pickup unit 31 and supplies the generated sound to the adder 38.

Then, the adder 38 adds the sound supplied from the audio supply unit 36 and the sound supplied from the noise removal processor 37 to each other, and the reproduction controller 39 supplies a resultant sound obtained by the adder 38 to the speaker 32 to be output.

For example, in this state, the user wears the earphones 21 on the user's ears and puts the body 22 into a pocket of clothes of the user. Then, when operating reproduction of next music or volume control, the user directly taps the sound pickup unit 31 by a ball of a finger so as to instruct execution of a desired process.

In the reproducing apparatus 11, in order to perform a process in accordance with such, a user's operation, when the reproducing apparatus 11 is turned on, the user's operation performed on the sound pickup unit 31 is detected and a reproduction control process for executing a process in accordance with the operation is repeatedly performed.

Hereinafter, the reproduction control process performed by the reproducing apparatus 11 will be described with reference to a flowchart shown in FIG. 3.

In step S11, the sound pickup unit 31 collects surrounding sound and supplies a resultant audio signal to the A/D converter 33. Then, the A/D converter 33 converts the audio signal which is an analog signal supplied from the sound pickup unit 31 into a digital signal and supplies the digital signal to the low-pass filter processor 61, the high-pass filter processor 64, and the zero-cross-value calculation unit 67.

For example, the A/D converter 33 samples the supplied audio signal using a sampling frequency of 44.1 kHz. Then, the A/D converter 33 normalizes an obtained sampling value so that the sampling value is included in a range from −1 to 1, and outputs a value $x(n)$ (where "n" is equal to 0, 1, 2, ...) as an audio signal which is a digital signal.

Note that "n" in the value $x(n)$ of the audio signal converted into the digital signal represents a time index, that is, an order of a sampling value.

Furthermore, the sampling frequency is not limited to 44.1 kHz as long as the sampling frequency is equal to or larger than approximately 16 kHz. This is because as long as the sampling frequency is equal to or larger than approximately 16 kHz, a function of detecting a sound generated when the sound pickup unit 31 is directly tapped is not affected. Furthermore, when a band width of 8 kHz or more, is set for the sound pickup of the sound pickup unit 31, an audio signal which is sufficiently useful for the determination as to whether the sound pickup unit 31 was directly tapped may be obtained.

In step S12, the low-pass filter processor 61 performs a filter process using a low-pass filter so as to extract low-frequency signals from the audio signal supplied from the A/D converter 33 and supplies the low-frequency signal to the low-frequency maximum-value calculation unit 62 and the low-frequency effective-value calculation unit 63.

Specifically, the low-pass filter processor 61 calculates Expression (1) below so as to extract low-frequency signals xl(n) from the audio signal.

[Expression (1)]

$$xl(n) = \sum_{i=0}^{Nl-1} x(n-i) \times hl(i) \quad (1)$$

Note that "Nl" in Expression (1) represents the number of taps of the low-pass filter and "hl(i)" represents coefficients of the low-pass filter. Accordingly, Nl audio signals which are temporally consecutive in a range from a value x(n) of the audio signal obtained in the latest sampling to a value x(n−Nl+1) are subjected to weighting addition so that low-frequency signals xl(n) are obtained.

In step S13, the high-pass filter processor 64 performs a filter process using a high-pass filter so as to extract high-frequency signals from the audio signal supplied from the A/D converter 33 and supplies the high-frequency signals to the high-frequency maximum-value calculation unit 65 and the high-frequency effective-value calculation unit 66.

Specifically, the high-pass filter processor 64 calculates Expression (2) below so as to extract high-frequency signals xh(n) from the audio signal.

[Expression (2)]

$$xh(n) = \sum_{i=0}^{Nh-1} \times (n-i) \times hh(i) \quad (2)$$

Note that, in Expression (2), "Nh" represents the number of taps of the high-pass filter and "hh(i)" represents coefficients of the high-pass filter. Accordingly, Nh audio signals which are temporally consecutive in the range from the value x(n) of the audio signal obtained in the latest sampling to the value x(n−Nh+1) are subjected to weighting addition so that high-frequency signals xh(n) are obtained.

Furthermore, the coefficients hl(i) and hh(i) in Expressions (1) and (2) correspond to FIR (Finite Impulse Response) type and have linear phases, and a cutoff frequency of the low-pass filter and the high-pass filter is 5512.5 Hz. That is, in the audio signal, frequency components equal to or lower than 5512.5 Hz correspond to low-frequency signals and frequency components larger than 5512.5 Hz correspond to high-frequency signals. Furthermore, the number of taps Nl of the low-pass filter and the number of taps Nh of the high-pass filter are 128, for example.

Figure 4:
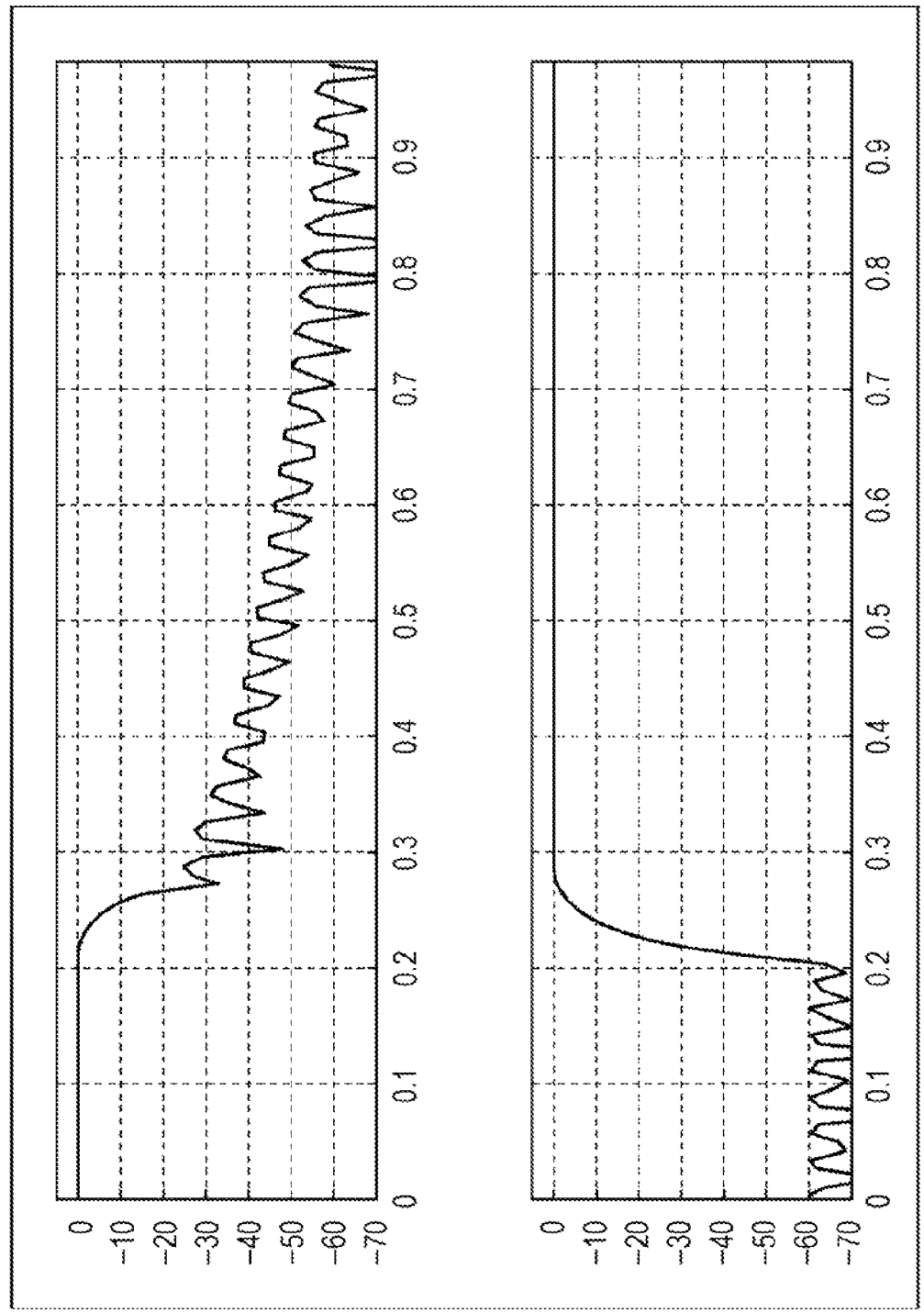
FIG. 4 includes diagrams illustrating frequency/amplitude characteristics of a low-pass filter and a high-pass filter.

In this case, the low-pass filter and the high-pass filter have frequency/amplitude characteristics as shown in FIG. 4. Note that, in FIG. 4, the frequency amplitude characteristic of the low-pass filter is shown on an upper side in the drawing whereas the frequency amplitudes characteristic of the high-pass filter is shown on a lower side in the drawing. Furthermore, in FIG. 4, axes of ordinate denote amplitude (dB) and axes of abscissa denote normalized frequencies.

In the low-pass filter shown on the upper side in the drawing, when a normalized frequency is in a range from 0 to 025, the amplitude is approximately 0, and the amplitude drastically becomes small in the vicinity of the normalized frequency of 0.25. Furthermore, in a range in which the normalized frequency is equal to or larger than 0.3, the larger the normalized frequency becomes, the smaller the amplitude becomes.

On the other hand, in the high-pass filter shown on the lower side in the drawing, in a range of the normalized frequency from 0 to approximately 0.2, the amplitude is approximately −60 dB, and the amplitude drastically becomes large in the vicinity of the normalized frequency of 0.2. Furthermore, in a range in which the normalized frequency is equal to or larger than 0.25, the amplitude is approximately 0 dB. As described above, in the high-pass filter, a stop-band attenuation amount is −60 dB.

Note that, although the case where the stop-band attenuation amount of the high-pass filter is −60 dB has been described as an example, any value may be employed in the stop-band attenuation amount as long as the stop-band attenuation amount is equal to or smaller than approximately −40 dB. As long as the stop-band attenuation amount is equal to or smaller than approximately −40 dB, the function of detecting a sound generated when the sound pickup unit 31 is directly tapped is hardly affected.

Furthermore, since influence of the stop-band attenuation amount of the low-pass filter to the function of detecting a sound generated when the sound pickup unit 31 is directly tapped is negligible, an all-pass filter may be employed instead of the low-pass filter. Moreover, although the case where the cutoff frequency of the low-pass filter and the high-pass filter is 5512.5 Hz has been described as an example, any value may be employed as the cutoff frequency as long as the cutoff frequency is included in a range from approximately 2 kHz to approximately 10 kHz. In this case, the function of detecting a sound generated when the sound pickup unit 31 is directly tapped is hardly affected.

Moreover, an IIR (Infinite Impulse Response) filter may be used as the low-pass filter or the high-pass filter. Note that, in this case, since it is difficult to realize a linear phase characteristic, there is a possibility that the function of detecting a sound generated when the sound pickup unit 31 is directly tapped is deteriorated.

Figure 3:
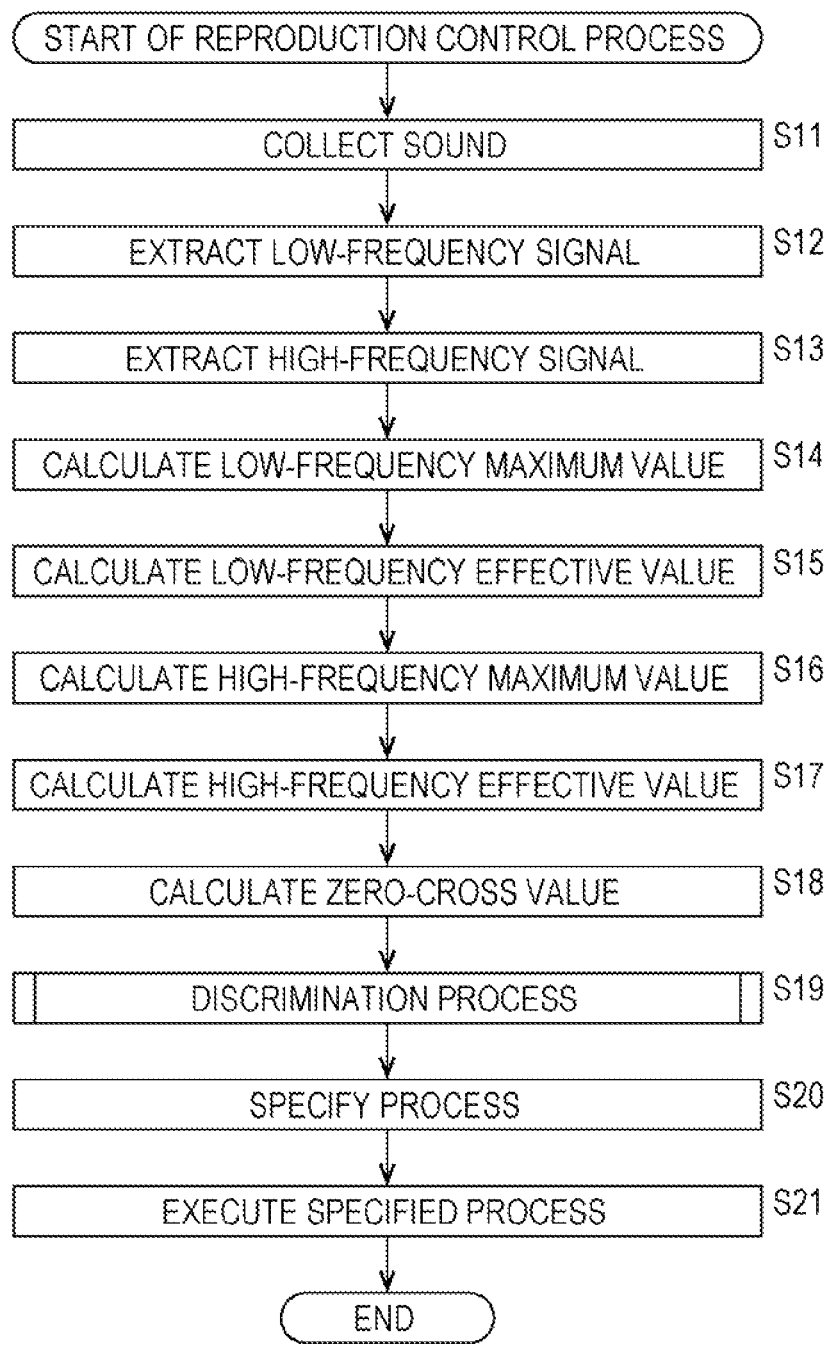
FIG. 3 is a flowchart illustrating a reproduction control process.

Referring back to the flowchart shown in FIG. 3, after the low-frequency signals and the high-frequency signals are extracted, the process proceeds from step S13 to step S14.

In step S14, the low-frequency maximum-value calculation unit 62 calculates low-frequency maximum values Pl(n) in accordance with the low-frequency signals supplied from the low-pass filter processor 61 and supplies the low-frequency maximum values Pl(n) to the discrimination processor 68. Specifically, the low-frequency maximum-value calculation unit 62 calculates Expression (3) below so as to obtain the low-frequency maximum values Pl(n).

[Expression (3)]

$$pl(n) = \max(|xl(n)|, |xl(n-1)|, |xl(n-2)|, \ldots, |xl(n-2047)|) \quad (3)$$

That is, absolute values of the latest n-th value xl(n) to the (n−2047)-th value xl(n−2047) in the past of the low-frequency signals are individually obtained, and the maximum values (maximum value norms) among the absolute values are determined to be low-frequency maximum values Pl(n).

Although low frequency signals of 2048 samples in the range from a current time n to a past time (n−2047) are processed and the low-frequency maximum values Pl(n) are calculated in Expression (3), the number of samples to be processed is not limited as long as the number of samples to be processed is equal to or larger than approximately 512. As long as the number of samples to be processed when the low-frequency maximum values Pl(n) is calculated is equal to or larger than approximately 512, the function of detecting a sound generated when the sound pickup unit 31 is directly tapped is not affected.

For example, when low frequency signals of 512 samples are to be processed, low-frequency signals of 512 samples in a range from a past time (n−1536) to a past time (n−2047) are used and the maximum values among absolute values of the low-frequency signals are determined to be the low-frequency maximum values Pl(n).

In step S15, the low-frequency effective-value calculation unit 63 calculates low-frequency effective values rmsl(n, m) (note that m is equal to 0, 1, 2, or 3) in accordance with the low-frequency signals supplied from the low-pass filter processor 61 and supplies the low-frequency effective values rmsl(n, m) to the discrimination processor 68. Specifically, the low-frequency effective-value calculation unit 63 performs calculation using Expression (4) below so as to obtain four low-frequency effective values rmsl(n, m).

[Expression (4)]

$$rmsl(n, m) = \sqrt{\left((1/512) \times \sum_{i=0}^{511} (xl(n+i-2047+m\times 512)^2)\right)} \quad (4)$$

That is, the low-frequency effective-value calculation unit 63 equally divides a low-frequency signal having the 2048 samples in the range from the current time n to the past time (n−2047) into four sections. Each of the four sections LS0 to LS3 obtained by the division includes values of the 512 samples of the low-frequency signal.

The low-frequency effective-value calculation unit 63 calculates a root-mean square value (Euclidean norm) of the values of the 512 samples of the low-frequency signal included in each of the sections LSm (where m is equal to 0, 1, 2, and 3), and determines the obtained Euclidean norm as the low-frequency effective value rmsl (n, m) of the corresponding one of the sections LSm.

Accordingly, a low-frequency effective value rmsl(n, 3) of the section LS3 corresponds to a root-mean square value of the values of the low frequency signal at times in a range from (a value at a timexl(n)) to (a value at a time (n−511)xl(n−511)) of the low frequency signal. The low-frequency effective values rmsl(n, m) obtained in this way serve as effective values in the individual sections of the low-frequency component of the audio signal.

Note that, although the case where the root-mean square value of the low-frequency signal is obtained has been described, absolute-value average values (primary average norms) of the low-frequency signal may be determined as the low-frequency effective values in order to improve the function of detecting a sound generated when the sound pickup unit 31 is tapped and to reduce a calculation amount.

Furthermore, in an example of Expression (4), the 2048 samples of the low-frequency signal included in the range from the current time n to the past time (n−2047) are processed so that the low-frequency effective values rmsl(n, m) are obtained. However, the number of samples to be processed is not limited as long as the number of samples to be processed is equal to or larger than approximately 1024. As long as the number of samples to be processed is equal to or larger than approximately 1024, the function of detecting a sound generated when the sound pickup unit 31 is directly tapped is not affected.

For example, when 1024 samples of the low-frequency signal are to be processed, the low-frequency signal in a range from the current time n to a past time (n−1023) is equally divided into two sections. Then, a root-mean-square value of values of 512 samples included in each of the sections of the low-frequency signal is obtained as a low-frequency effective value.

Furthermore, although the case where the section (the number of samples) to be processed is equally divided when the low-frequency effective values are to be calculated has been described, the low-frequency signal may be unevenly divided in accordance with a characteristic of a waveform of the low-frequency signal. In this case, a small section corresponding to a characteristic waveform portion of the low-frequency signal is obtained, and accordingly, the function of detecting a sound generated when the sound pickup unit 31 is directly tapped may be improved using low-frequency effective values.

In step S16, the high-frequency maximum-value calculation unit 65 obtains a high-frequency maximum value Ph(n) in accordance with the high-frequency signal supplied from the high-pass filter processor 64. Specifically, the high-frequency maximum-value calculation unit 65 calculates Expression (5) below so as to obtain the high-frequency maximum value Ph(n).

[Expression (5)]

$$ph(n) = \max(|xh(n)|, |xh(n-1)|, (xh(n-2)|, \ldots, |xh(n-2047)|) \quad (5)$$

Specifically, absolute values corresponding to a value xh(n) of the current time n of the high-frequency signal to a value xh(n−2047) of the past time (n−2047) are obtained, and the maximum value (maximum value norm) among the absolute values is determined to be the high-frequency maximum value Ph(n).

Furthermore, the high-frequency maximum-value calculation unit 65 supplies a time (time index) hi of a sample having the maximum absolute value of the high frequency signal among the samples to be processed to the discrimination processor 68 along with the high-frequency maximum value Ph(n).

In step S17, the high-frequency effective-value calculation unit 66 calculates high-frequency effective values rmsh(n, m) (where m=0, 1, 2, . . . , or 31) in accordance with the high-frequency signal supplied from the high-pass filter processor 64 and supplies the high-frequency effective values rmsh(n, m) to the discrimination processor 68. Specifically, the high-frequency effective-value calculation unit 66 calculates Expression (6) below so as to obtain 32 high-frequency effective values rmsh(n, m).

[Expression (6)]

$$rmsh(n, m) = \sqrt{\left((1/64) \times \sum_{i=0}^{63} (xh(n+i-2047+m\times 64)^2)\right)} \quad (6)$$

Specifically, the high-frequency effective-value calculation unit 66 equally divides the high-frequency signal corresponding to 2048 samples in a range from the current time n to the past time (n−2047) into 32 sections. Each of the 32 sections HS0 to HS31 obtained through the division includes values of consecutive 64 samples of the high-frequency signal.

The high-frequency effective-value calculation unit 66 obtains a root-mean-square value (Euclidean norm) of values of the 64 samples of the high frequency signal included in one of the sections HSm (where m=0, 1, 2, . . . , or 31) and determines the obtained root-mean square value to be a high-frequency effective value rmsh(n, m) of the section HSm.

Note that, although the case where the root-mean square value of the high-frequency signal is obtained has been described, absolute-value average values (primary average norms) of the high-frequency signal may be determined as high-frequency effective values in order to improve the function of detecting a sound generated when the sound pickup unit 31 is tapped and to reduce a calculation amount.

Furthermore, in an example of Expression (6), the 2048 samples of the high-frequency signal in the range from the current time n to the past time (n−2047) are processed so that the high-frequency effective values rmsh(n, m) are obtained. However, the number of samples to be processed is not limited as long as the number of samples to be processed is equal to or larger than approximately 1024. As long as the number of samples to be processed is equal to or larger than approximately 1024, the function of detecting a sound generated when the sound pickup unit 31 is directly tapped is not affected.

For example, when the 1024 samples of the high-frequency signal are to be processed, the high-frequency signal corresponding to a range from a past time (n−1024) to the past time (n−2047) is equally divided into 16 sections. Then, a root-mean square value of values of 64 samples of the high-frequency signal included in each of the sections is determined to be a high-frequency effective value.

Furthermore, the case where the section (the number of samples) is equally divided when the high-frequency effective values are to be calculated has been described. However, the high-frequency signal may be unevenly divided in accordance with a characteristic of the waveform of the high-frequency signal. In this case, a small section corresponding to a characteristic waveform portion of the high-frequency signal is obtained, and accordingly, the function of detecting a sound generated when the sound pickup unit 31 is directly tapped may be improved using the high-frequency effective values.

In step S18, the zero-cross-value calculation unit 67 calculates Expression (7) below in accordance with the audio signal x(n) supplied from the A/D converter 33 so as to obtain a zero-cross value zcr(n) and supplies the zero-cross value zcr(n) to the discrimination processor 68.

[Expression (7)]

$$zcr(n) = (1/2048) \sum_{i=0}^{2047} \text{negative}(x(n-i) \times x(n-i-1)) \quad (7)$$

Note that, in Expression (7), "negative(A)" is a function to which 1 is set when a parameter is negative and 0 is set when the parameter is not negative. Accordingly, the zero-cross value zcr(n) represents a ratio of the audio signal (the waveform of the audio signal) which intersects with 0 in the range from the current time n to the past time (n−2048).

By performing the process described above, the low-frequency maximum value, the low-frequency effective values, the high-frequency maximum value, the high-frequency effective values, and the zero-cross value are supplied as feature amounts of the characteristic of the audio signal to the discrimination processor 63. Note that, when it is not necessary to distinguish the low-frequency maximum value, the low-frequency effective values, the high-frequency maximum value, the high-frequency effective values, and the zero-cross value from one another, the low-frequency maximum value, the low-frequency effective values, the high-frequency maximum value, the high-frequency effective values, and the zero-cross value are simply referred to as "feature amounts" hereinafter where appropriate.

In step S19, the discrimination unit 34 performs a determination process so as to determine whether the sound collected by the sound pickup unit 31 corresponds to a sound generated when the user directly tapped the sound pickup unit 31 by a ball of a finger, and supplies a result of the determination to the controller 35.

Note that, although the determination process will be described hereinafter, when the future amounts of the audio signal satisfy a predetermined condition, a determination result representing that the sound pickup unit 31 has been directly tapped is output whereas when the future amounts do not satisfy the predetermined condition, a determination result representing that the sound pickup unit 31 has not been directly tapped is output in the determination process. Hereinafter, the determination result representing that the sound pickup unit 31 has been directly tapped is referred to as a positive determination result where appropriate whereas the determination result representing that the sound pickup unit 31 has not been directly tapped is also referred to as a negative determination result where appropriate.

When the determination process has been performed, the determination result is supplied from the discrimination units 34-1 and 34-2 to the controller 35. That is, the process in step S11 to step S19 is individually performed by a group including the sound pickup unit 31-1, the A/D converter 33-1, and the discrimination unit 34-1 and a group including the sound pickup unit 31-2, the A/D converter 33-2, and the discrimination unit 34-2.

In step S20, the controller 35 specifies a process corresponding to a user's instruction for execution in accordance with the determination result supplied from the discrimination processor 68 of the discrimination unit 34.

For example, in the reproducing apparatus 11, specific processes are assigned to the individual sound pickup units 31 in advance in accordance with the number of times the sound pickup unit 31 is tapped within a predetermined period of time. For example, when only the sound pickup unit 31-1 is tapped once within the predetermined period of time, volume of music being reproduced is turned up, when only the sound pickup unit 31-2 is tapped once within the predetermined period of time, the volume of the music being reproduced is turned down, and when only the sound pickup unit 31-1 is tapped twice within the predetermined period of time, the reproduction of the music is stopped.

The controller 35 specifies one of the sound pickup units 31 which is tapped (operated) and the number of times the sound pickup unit 31 is tapped (operated) in accordance with determination results sequentially supplied from the discrimination unit 34 and specifies a predetermined process to be performed in accordance with the specified result.

Accordingly, when a positive determination result is supplied from the sound pickup unit 31-1 twice within the predetermined period of time and a negative determination result is supplied from the sound pickup unit 31-2, in the example described above, a process of stopping the reproduction of the music is specified.

Note that any function (process) such as turning up and turning up of volume, reproduction and stop of music, fast forward, fast rewind, change of a setting, or power off may be assigned to an operation performed on the sound pickup unit 31 as long as the process is executed in the reproducing apparatus 11. Furthermore, a process may be assigned to operations performed by two sound pickup units 31 in combination, for example, when the sound pickup units 31-1 and 31-2 are alternately tapped within a predetermined period of time or when the sound pickup units 31-1 and 31-2 are simultaneously tapped.

In step S21, the controller 35 executes the process specified in step S20 and the reproduction control process is terminated.

For example, when a process of temporarily stopping the reproduction of the music is specified, the controller 35 instructs the reproduction controller 39 to temporarily stop supply of audio from the reproduction controller 39 to the speaker 32. Furthermore, when a process of turning up volume is specified, for example, the controller 35 instructs the reproduction controller 39 to turn up the volume of the audio supplied from the reproduction controller 39 to the speaker 32.

As described above, the reproducing apparatus 11 calculates the feature amounts of the sound collected by the sound pickup unit 31, determines whether the collected sound corresponds to a sound generated when the sound pickup unit 31 is directly tapped in accordance with the feature amounts, and executes a process in accordance with a result of the determination.

By this, operability of the reproducing apparatus 11 is further improved with a simple configuration. That is, in the reproducing apparatus 11, the sound pickup unit 31 provided for so-called noise cancelling collects ambient sound, feature amounts of features of the sound are obtained, and a user's operation is specified in accordance with the feature amounts.

Accordingly, it is not necessary for the user to pick up the reproducing apparatus from a pocket so that the user directly touches a button or a touch panel disposed on the reproducing apparatus body, but control of reproduction of music or the like may be performed by the reproducing apparatus 11 only by tapping the sound pickup unit 31. In addition, since a user's operation is specified in accordance with the sound collected by the sound pickup unit 31, it is not necessary to dispose a button for controlling reproduction on the reproducing apparatus 11, and accordingly, simple configuration of the reproducing apparatus 11 is attained.

Description of Determination Process

Referring now to a flowchart shown in FIG. 5, the determination process corresponding to the process performed in step S19 of FIG. 3 will be described. Note that the determination process is performed in each of the discrimination units 34-1 and 34-2.

In step S51, the discrimination processor 68 determines whether a time index hi supplied from the high-frequency maximum-value calculation unit 65 satisfies Expression (8) below.

[Expression (8)]

$$hi = n - hi\_peak \tag{8}$$

Note that, in Expression (8), "hi_peak" represents a predetermined constant, and is 1791, for example. Furthermore, the time index hi corresponds to a time when an absolute value of the high-frequency signal becomes maximum. Accordingly, in step S51, it is determined whether the maximum absolute value of the high-frequency signal is obtained at a time (n-hi_peak).

In a high-frequency signal, at a time when the sound pickup unit 31 is directly tapped by the user, the maximum absolute value of the high-frequency signal should be obtained. Therefore, when it is determined that an audio signal having a maximum absolute value at a time before the current time n which is a processing reference by a predetermined period of time (here, hi_peak) corresponds to an object to be subjected to the determination as to whether the object corresponds to the sound generated when the sound pickup unit 31 is directly tapped, determination accuracy is improved. That is, a waveform of an audio signal in which period of times before and after the sound pickup unit 31 is directly tapped by the user, that is, a waveform having a specific phase is determined to be processed, and the determination of sound may be more easily and more precisely performed.

Note that since the function of detecting a sound generated when the sound pickup unit 31 is tapped is not affected by the predetermined time hi_peak as long as the predetermined time hi_peak is equal to or larger than approximately (1791−128) and equal to or smaller than approximately (1791+128), the time high_peak should be approximately 1791.

When it is determined that the maximum absolute value of the high-frequency signal is not obtained at the time (n−hi_peak) in step S51, the discrimination processor 68 supplies a result of the determination representing that the sound pickup unit 31 has not been tapped, that is, a negative determination result to the controller 35 in step S52. Then, when the determination result is output, the determination process is terminated, and thereafter, the process proceeds to step S20 of FIG. 3.

On the other hand, when it is determined that the maximum absolute value of the high-frequency signal is obtained at the time (n-hi_peak) in step S51, the discrimination processor 68 determines whether the high-frequency maximum value Ph(n) supplied from the high-frequency maximum-value calculation unit 65 satisfies Expression (9) below in step S53.

[Expression (9)]

$$ph(n) \geq ph\_low \tag{9}$$

Note that, in Expression (9), "ph_low" denotes a predetermined threshold value. In step S53, it is determined whether the high-frequency maximum value Ph(n) is equal to or larger than the threshold value ph_low.

When it is determined that the high-frequency maximum value is smaller than the threshold value ph_low in step S53, a negative determination result is output in step S52 and the determination process is terminated. Thereafter, the process proceeds to step S20 of FIG. 3.

When the sound pickup unit 31 is directly tapped, a high-frequency component of a collected sound should have a certain level of strength (amplitude). Therefore, when the high-frequency maximum value is smaller than the threshold value ph_low, it is determined that a sound being processed (audio signal) does not correspond to a sound generated when the sound pickup unit 31 is directly tapped, and therefore, a negative determination result is output.

On the other hand, when it is determined that the high-frequency maximum value is equal to or larger than the threshold value ph_low in step S53, the discrimination processor 68 determines whether the high-frequency effective values rmsh(n, m) supplied from the high-frequency effective-value calculation unit 66 satisfy Expression (10) below.

[Expression (10)]

$$rmsh(n,m) \leq rmsh\_high(m) \qquad (10)$$

Note that, in Expression (10), "rmsh_high(m)" (where m=0, 1, 2, ..., or 31) is predetermined threshold values. In step S54, it is determined whether the high-frequency effective values rmsh(n, m) of the sections HSm are equal to or smaller than the threshold values rmsh_high(m) in step S54. That is, it is determined whether the high-frequency effective values rmsh(n, 0) to rmsh(n, 31) are equal to or smaller than the threshold values rmsh_high(0) to rmsh_high(31), respectively.

When it is determined that the high-frequency effective values are not equal to or smaller than the threshold values rmsh_high(m) in step S54, a negative determination result is output in step S52 and the process is terminated. Thereafter, the process proceeds to step S20 of FIG. 3.

When the sound pickup unit 31 is directly tapped, a high-frequency component of a collected sound has a characteristic in which effective values in the vicinity of a time when the sound pickup unit 31 is tapped are large and effective values in other sections are not so large. The threshold values rmsh_high(m) are determined for the individual sections in accordance with the characteristic. Then, when at least one of the high-frequency effective values of the sections exceeds a corresponding one of the threshold values rmsh_high(m), it is determined that the sound being processed does not correspond to a sound generated when the sound pickup unit 31 is directly tapped, and a negative determination result is output.

Furthermore, when it is determined that the high-frequency effective values are equal to or smaller than the threshold values rmsh_high(m) in step S54, the discrimination processor 68 determines whether the low-frequency maximum value Pl(n) supplied from the low-frequency maximum-value calculation unit 62 satisfies Expression (11) below in step S55.

[Expression (11)]

$$pl(n) \geq pl\_low \qquad (11)$$

Note that, in Expression (11), "pl_low" denotes a predetermined threshold value. In step S55, it is determined whether the low-frequency maximum value Pl(n) is equal to or larger than the threshold value pl_low.

When it is determined that the low-frequency maximum value is smaller than the threshold value pl_low in step S55, a negative determination result is output in step S52 and the determination process is terminated. Thereafter, the process proceeds to step S20 of FIG. 3.

When the sound pickup unit 31 is directly tapped, especially when a hole of a microphone included in the sound pickup unit 31 is tapped so as to be covered by a ball of a finger of the user, a low-frequency component of a collected sound should have a certain level of strength (amplitude). Therefore, when the low-frequency maximum value is smaller than the threshold value pl_low, it is determined that the sound being processed does not correspond to a sound generated when the sound pickup unit 31 is directly tapped, and therefore, a negative determination result is output.

On the other hand, when it is determined that the low-frequency maximum value is equal to or larger than the threshold value pl_low in step S55, the discrimination processor 68 determines whether the low-frequency effective values rmsl(n, m) supplied from the low-frequency effective-value calculation unit 63 satisfy Expression (12) below in step S56.

[Expression (12)]

$$rmsl(n,m) \geq rmsl\_low(m) \qquad (12)$$

Note that, in Expression (12), "rmsl_low(m)" (where m=0, 1, 2, or 3) represents predetermined threshold values. In step S56, it is determined whether the low-frequency effective values rmsl(n, m) of the sections LSm are equal to or larger than the threshold values rmsl_low(m). That is, it is determined whether the low-frequency effective value rmsl(n, 0) to the low-frequency effective value rmsl(n, 3) are equal to or larger than the threshold values rmsl_low(0) to the threshold values rmsl_low(3), respectively.

When it is determined that the low-frequency effective values are not equal to or larger than the threshold values rmsl_low(m) in step S56, a negative determination result is output in step S52 and the determination process is terminated. Thereafter, the process proceeds to step S20 of FIG. 3.

When the sound pickup unit 31 is directly tapped, the low-frequency component of the collected sound has a characteristic in which large effective values are obtained in a certain period of time after a time when the sound pickup unit 31 is tapped, and the threshold values rmsl_low(m) for the sections are determined in advance in accordance with the characteristic. Then, when at least one of the low-frequency effective values of the sections is smaller than the corresponding one of the threshold values rmsl_low(m), it is determined that the sound being processed does not correspond to a sound generated when the sound pickup unit 31 is directly tapped, and a negative determination result is output.

Furthermore, when it is determined that the low-frequency effective values are equal to or larger than the threshold values rmsl_low(m) in step S56, the discrimination processor 68 determines whether the zero-cross value zcr(n) supplied from the zero-cross-value calculation unit 67 satisfies Expression (13) below.

[Expression (13)]

$$zcr(n) \leq zcr\_high \qquad (13)$$

Note that, in Expression (13), "zcr_high" represents a predetermined threshold value, and in step S57, it is determined whether the zero-cross value zcr(n) is equal to or smaller than the threshold value zcr_high.

When it is determined that the zero-cross value is larger than the threshold value zcr_high in step S57, a negative determination result is output in step S52 and the determination process is terminated. Thereafter, the process proceeds to step S20 of FIG. 3.

Since the collected sound includes a large number of low-frequency components when the sound pickup unit 31 is directly tapped, a zero-cross value of the collected sound should be somewhat small. Therefore, when the zero-cross value zcr(n) exceeds the threshold value zcr_high, it is determined that the sound being processed does not corresponds to a sound generated when the sound pickup unit 31 is directly tapped and a negative determination result is output.

On the other hand, when it is determined that the zero-cross value zcr(n) is equal to or smaller than the threshold value zcr_high, the process proceeds to step S58.

In step S58, the discrimination processor 68 supplies a determination result representing that the sound pickup unit 31 is tapped, that is, a positive determination result to the controller 35. Then, when the determination result is output, the determination process is terminated, and thereafter, the process proceeds to step S20 of FIG. 3.

As described above, the discrimination processor 68 determines whether the feature amounts of the features of the collected sound satisfy a condition which is to be satisfied when a sound generated when the sound pickup unit 31 is directly tapped to thereby determine whether the collected sound corresponds to a sound generated when the sound pickup unit 31 is directly tapped. Since it is determined whether each of the features of the collected sound satisfies a condition, discrimination of the sound may be more reliably performed.

Threshold Value ph_low for High-Frequency Maximum Value

Here, the threshold value ph_low, the threshold values rmsh_high(m), the threshold value pl_low, the threshold values rmsl_low(m), and the threshold value zcr_high are obtained using a number of samples and recorded in the discrimination processor 68.

For example, a number of sounds generated when the sound pickup unit 31 is directly tapped and a number of sounds generated when the sound pickup unit 31 is not directly tapped are collected under various conditions, for example, conditions when the user is on a train or on a bus, or when the user is walking, such a sound is used as learning data for a positive determination or a negative determination, and a determination boundary in a feature space including the future amounts is obtained as a threshold value.

A method for calculating the threshold values will be described hereinafter.

Figure 6:
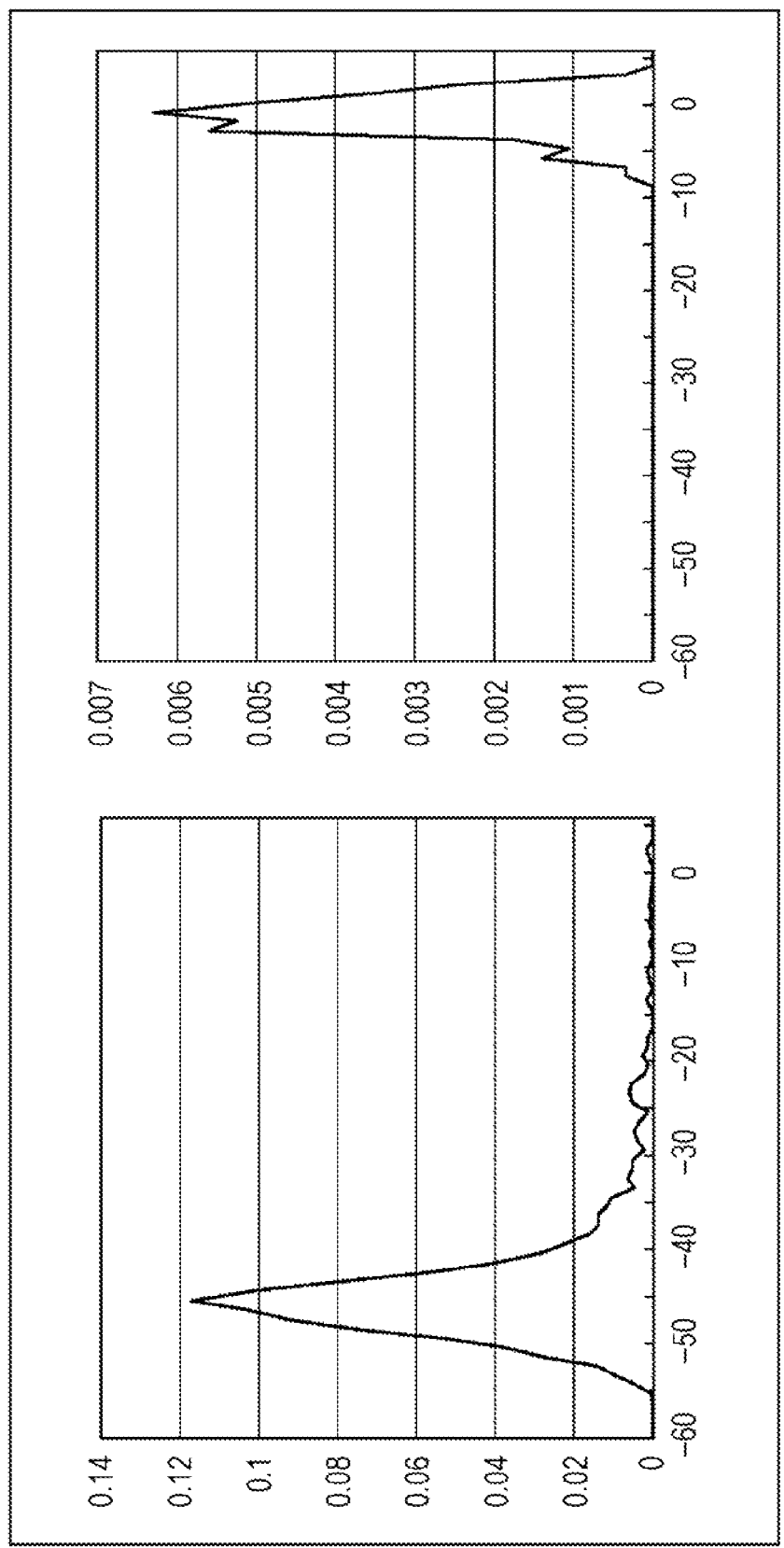
FIG. 6 includes diagrams illustrating probabilities of appearance of high-frequency maximum values.

First, the threshold value ph_low for the high-frequency maximum value Ph(n) will be described. FIG. 6 is a diagram illustrating probabilities of appearance of high-frequency maximum value Ph(n) under conditions in which the user is on a train or on a bus, or the user is walking. Note that, in the drawing, axes of abscissa denote high-frequency maximum values (dB) of sounds serving as samples and axes of ordinate denote probabilities of appearance.

In FIG. 6, a probability of appearance of a sound generated when the sound pickup unit 31 is not tapped (hereinafter referred to as an "ambient sound") is shown on a left side of the drawing, and a probability of appearance of a sound generated when the sound pickup unit 31 is directly tapped (hereinafter referred to as an "operation sound") is shown on a right side of the drawing.

High-frequency maximum values of the ambient sound are distributed in a portion around −45 dB whereas high-frequency maximum values of the operation sound are distributed in a portion around 0 dB. An ambient sound having a high-frequency maximum value of approximately 0 dB hardly exists. Specifically, the high-frequency maximum values of the operation sound are distributed in portions corresponding to values larger than those of the high-frequency maximum values of the ambient sound. Using a difference between a statistical distribution of the high-frequency maximum values of the ambient sound and a statistical distribution of the high frequency maximum values of the operation sound, a prediction (discrimination) of the ambient sound or the operation sound is performed.

For example, for the discrimination of the operation sound from the operation sound, a linear discriminant analysis is used. When the linear discriminant analysis is performed and an explanatory variate corresponds to the high-frequency maximum value Ph(n) and an object variate corresponds to data of two groups of the ambient sound and the operation sound, a discriminant as denoted by Expression (14) is obtained.

[Expression (14)]

$$zph = ph(n) - ph\_low \quad (14)$$

For example, when the samples shown in FIG. 6 are used, 0.0679 is obtained as a constant term. The constant term ph_low corresponds to a midpoint between a median point of the distribution of the ambient sound and a median point of the distribution of the operation sound shown in FIG. 6.

In Expression (14), when a discrimination point zph is equal to or larger than 0, it is determined that the sound being processed corresponds to the operation sound whereas when the discrimination point zph is smaller than 0, it is determined that the sound being processed is not the operation sound, that is, the sound being processed is the ambient sound. The constant term ph_low of this discriminant is determined as the threshold value ph_low of the high-frequency and is recorded in the discrimination processor 68.

Note that, in the discrimination performed in accordance with Expression (14) using one feature amount, that is, the high-frequency maximum value Ph(n), an insufficient detection in which the operation sound is determined as the ambient sound or an excess detection in which the ambient sound is determined as the operation sound may occur in many cases.

In order to reduce frequency of the insufficient detection, optimization is realized by changing the threshold value ph_low in a negative direction, that is, by making the threshold value ph_low smaller. However, in this case, the excess detection may fluently occur. On the other hand, in order to reduce frequency of, the excess detection, optimization is realized by changing the threshold value ph_low in a positive direction, that is, by making the threshold value ph_low larger. However, in this case, the insufficient detection may fluently occur.

Since the discrimination is performed in a plurality of stages in the discrimination process performed by the discrimination processor 68, as described with reference to FIG. 5, in the discrimination using the high-frequency maximum value Ph(n), the threshold value ph_low is changed in the negative direction for optimization so that the frequency of the insufficient detection is reduced and the frequency of the excess detection is increased. Then, when the frequency of the excess detection is reduced in a step-by-step manner in a discrimination using the high-frequency effective values, the low-frequency maximum value, the low-frequency effective values, and the zero-cross values which is performed thereafter, discrimination of the operation sound is more reliably performed.

Threshold Values rmsh_high(m) for High-Frequency Effective Values

Figure 7:
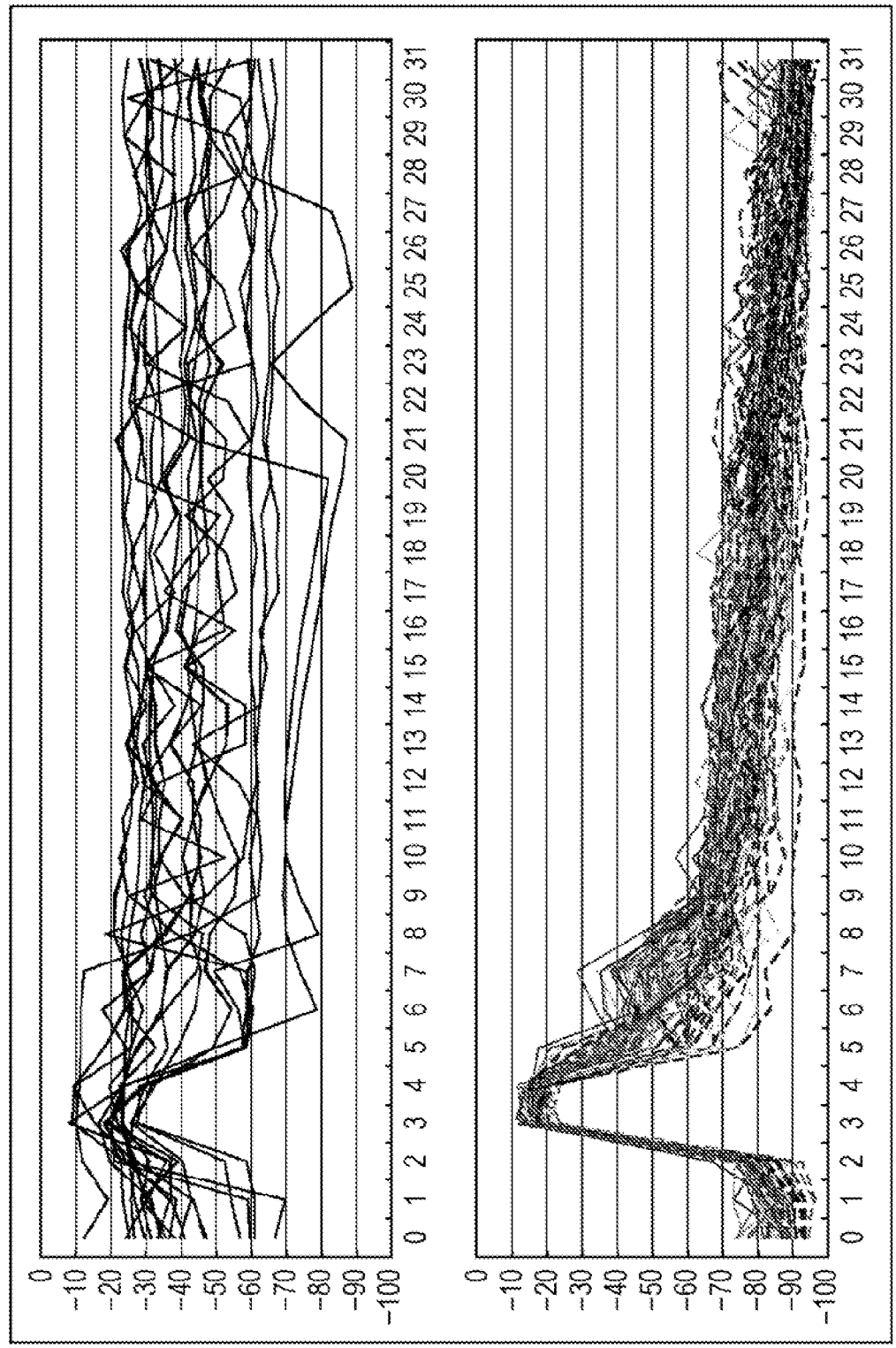
FIG. 7 includes diagrams illustrating distribution of high-frequency effective values.

Next, the threshold values rmsh_high(m) of the high-frequency effective values rmsh(n, m) will be described. FIG. 7 is a diagram illustrating the high-frequency effective values rmsh(n, m) under various conditions in which the user is on a train or a bus or the user is walking.

Note that, in the drawing, axes of abscissa denote the sections HSm, that is, a variable m (where m=1, 2, . . . , or 31) of the high-frequency effective values rmsh(n, m) and axes of ordinate denote the high-frequency effective values (dB) of the sections HSm.

In FIG. 7, high-frequency effective values of the ambient sound are shown on an upper side in the drawing and high-frequency effective values of the operation sound are shown on a lower side in the drawing. Furthermore, the high-frequency effective values shown in FIG. 7 correspond to high-frequency effective values of samples (sounds) which satisfy a condition in which the time index hi is equal to "n−hi_peak" described in step S51 of FIG. 5 where "hi_peak" is equal to 1791.

Therefore, the high-frequency effective values of the ambient sound and the operation sound are distributed in portions corresponding to large values around sections where m is equal to 2 and 3. Furthermore, the high-frequency effective values of the operation sound are distributed in portions corresponding to small values around sections where m is equal to or smaller than 2 and portions where m is equal to or larger than 5.

As described above, the operation sound is characterized in that the high-frequency effective values in sections in the vicinity of a time when the sound pickup unit 31 is directly tapped are large whereas the high-frequency effective values in other sections are comparatively small. On the other hand, the high-frequency effective values of the ambient sound have a certain level in any section.

A difference between a statistic distribution of the high-frequency effective values rmsh(n, m) of the ambient sound and a statistic distribution of the high-frequency effective values rmsh(n, m) of the operation sound is used to predict (discriminate) the ambient sound or the operation sound so that the frequency of the excess detection is reduced.

For example, when the operation sound is discriminated from the ambient sound, the linear discriminant analysis is employed. When the high-frequency effective values rmsh(n, m) are determined as explanatory variates and data of two groups of the ambient sound and the operation sound is determined as object variates, a discriminant as shown in Equation (15) is obtained.

[Expression (15)]

$$zrmsh(m) = -rmsh(n,m) + rmsh\_high(m) \quad (15)$$

For example, when the samples shown in FIG. 7 are used, values shown in FIG. 8 are obtained as constant terms rmsh_high(m) for variables m, that is, constant terms rmsh_high(0) to rmsh_high(31). Among the constant terms, the constant terms rmsh_high(3) to rmsh_high(5) are especially large values in accordance with the high-frequency effective values of the operation sound shown in FIG. 7.

In Expression (15), when all discrimination points zrmsh(m) in the section HS0 to HS31 are equal to or larger than 0, it is determined that sound being processed corresponds to the operation sound whereas when at least one of the HSm corresponds to a discrimination point zrmsh(m) smaller than 0, it is determined that the sound being processed is the ambient sound. The constant terms rmsh_high(m) of this discriminant are determined as threshold values for the high-frequency effective values and are recorded in the discrimination processor 68.

Note that, as with the optimization of the insufficient detection and the excess detection performed by changing the threshold value ph_low described above, the optimization of the insufficient detection and the excess detection may be performed by changing the threshold values rmsh_high(m) of the high-frequency effective values. However, since the number of threshold values (constant terms) is 32, such a change is difficult.

On the other hand, when the linear discriminant analysis is performed and the explanatory variates correspond to 32-order high-frequency effective values rmsh(n, m) (where m=0, 2, . . . , or 31), a discriminant of Expression (16) is obtained.

[Expression (16)]

$$zrmsh = \sum_{m=0}^{31} (a\_rmsh(m) \times rmsh(n, m)) + b\_rmsh \quad (16)$$

In Expression (16), "a_rmsh(m)" (where m=0, 1, 2, . . . , or 31) represents linear discriminant coefficients and "b_rmsh" is a constant term of the linear discriminant. Then, when a discrimination point zrmsh in Expression (16) is equal to or larger than 0, the sound being processed is determined to be the operation sound whereas when the discrimination point zrmsh is smaller than 0, the sound being processed is determined to be the ambient sound.

When the discriminant of Expression (16) is used, similarly to the optimization of the insufficient detection and the excess detection performed by changing the threshold value ph_low, the insufficient detection and the excess detection may be easily optimized by changing the constant term b_rmsh when compared with the case of the discriminant of Expression (15).

Figure 5:
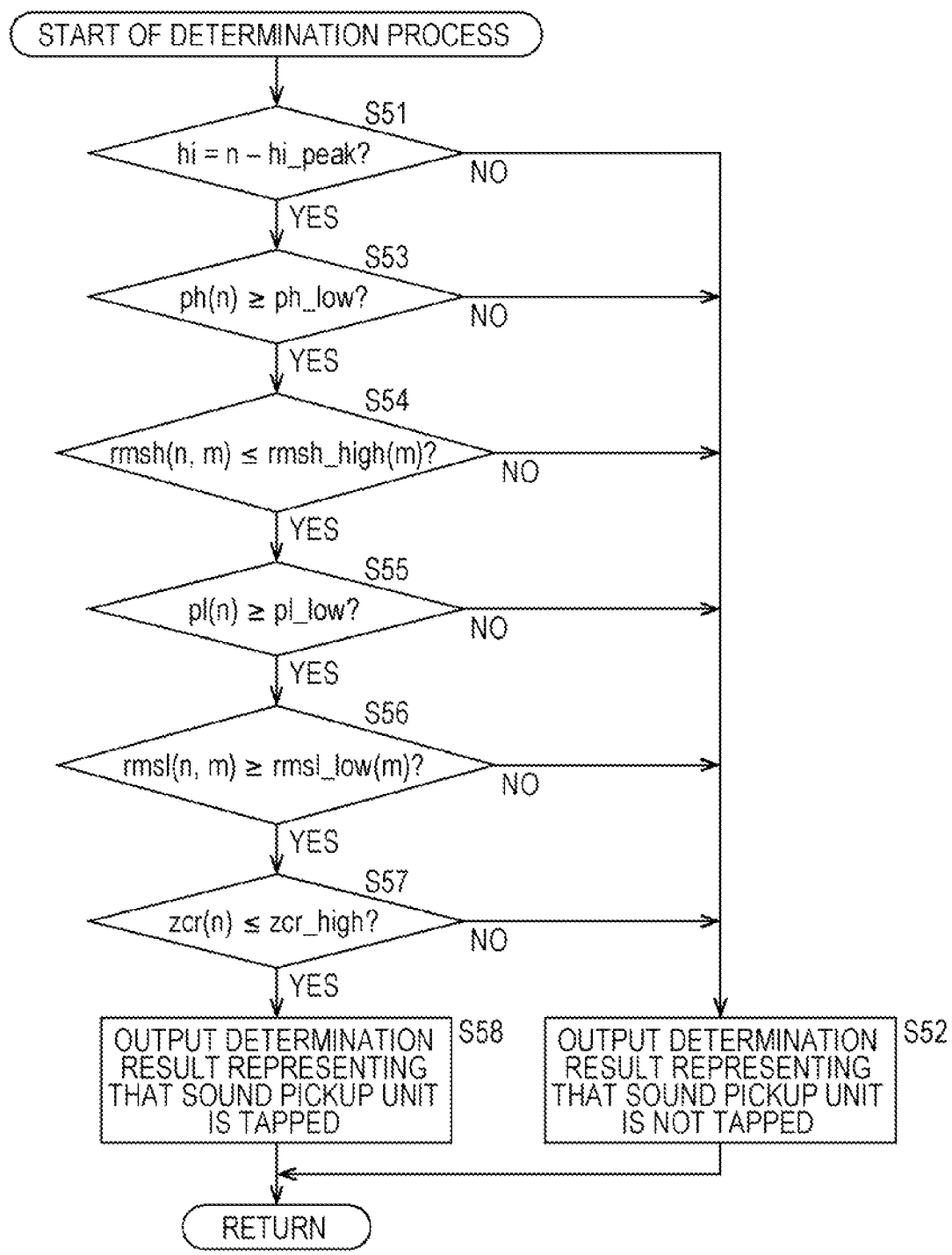
FIG. 5 is a flowchart illustrating a determination process.

When the constant term b_rmsh is determined as a threshold value, in step S54 of FIG. 5, a sum of products of the linear discriminant coefficients a_rmsh(m) and the high-frequency effective values rmsh(n, m) are compared with a threshold value (−b_rmsh) so that a discrimination of the operation sound is performed. That is, when a sum of the high-frequency effective values which are multiplied by the linear discriminant coefficients exceeds −b_rmsh, it is determined that the sound being processed is the ambient sound.

Furthermore, when the 32-order high-frequency effective values rmsh(n, m) which are the explanatory variates in Expression (16) are converted into logarithmic scales as shown in Expression (17), the frequency of the insufficient detection and the excess detection may be further reduced.

[Expression (17)]

$$zrmsh = \sum_{m=0}^{31} (al\_rmsh(m) \times \log_{10}(rmsh(n, m))) + bl\_rmsh \quad (17)$$

Note that, in Expression 17), "al_rmsh(m)" (where m 0, 1, 2, . . . , or 31) represents linear discriminant coefficients and "bl_rmsh" represents a constant term of the linear discriminant. Also in the discriminant of Expression (17), when the discrimination point zrmsh is equal to or larger than 0, it is determined that generated sound is the operation sound whereas when the discrimination point zrmsh is smaller than 0, it is determined that generated sound is the ambient sound.

Furthermore, in the discriminant of Expression (17), the insufficient detection and the excess detection may be optimized by changing the constant term bl_rmsh. When the constant term bl_rmsh is determined as a threshold value, in step S54 of FIG. 5, a sum of products of the linear discriminant coefficients and logarithmic values of the high-frequency effective values rmsn(n, m) to the base is compared with the threshold value (−bl_rmsh) so that discrimination of the operation sound is performed. Specifically, when the sum of the products of the linear discriminant coefficients and the logarithmic values of the high-frequency effective values rmsn(n, m) exceeds −bl_rmsh, it is determined that the sound being processed is the ambient sound.

Note that one of the discriminants among Expression (15) to Expression (17) to be used is selected in accordance with balance among the calculation amount, the insufficient detection, and the excess detection.

Threshold Value pl_low for Low-Frequency Maximum Value

Figure 9:
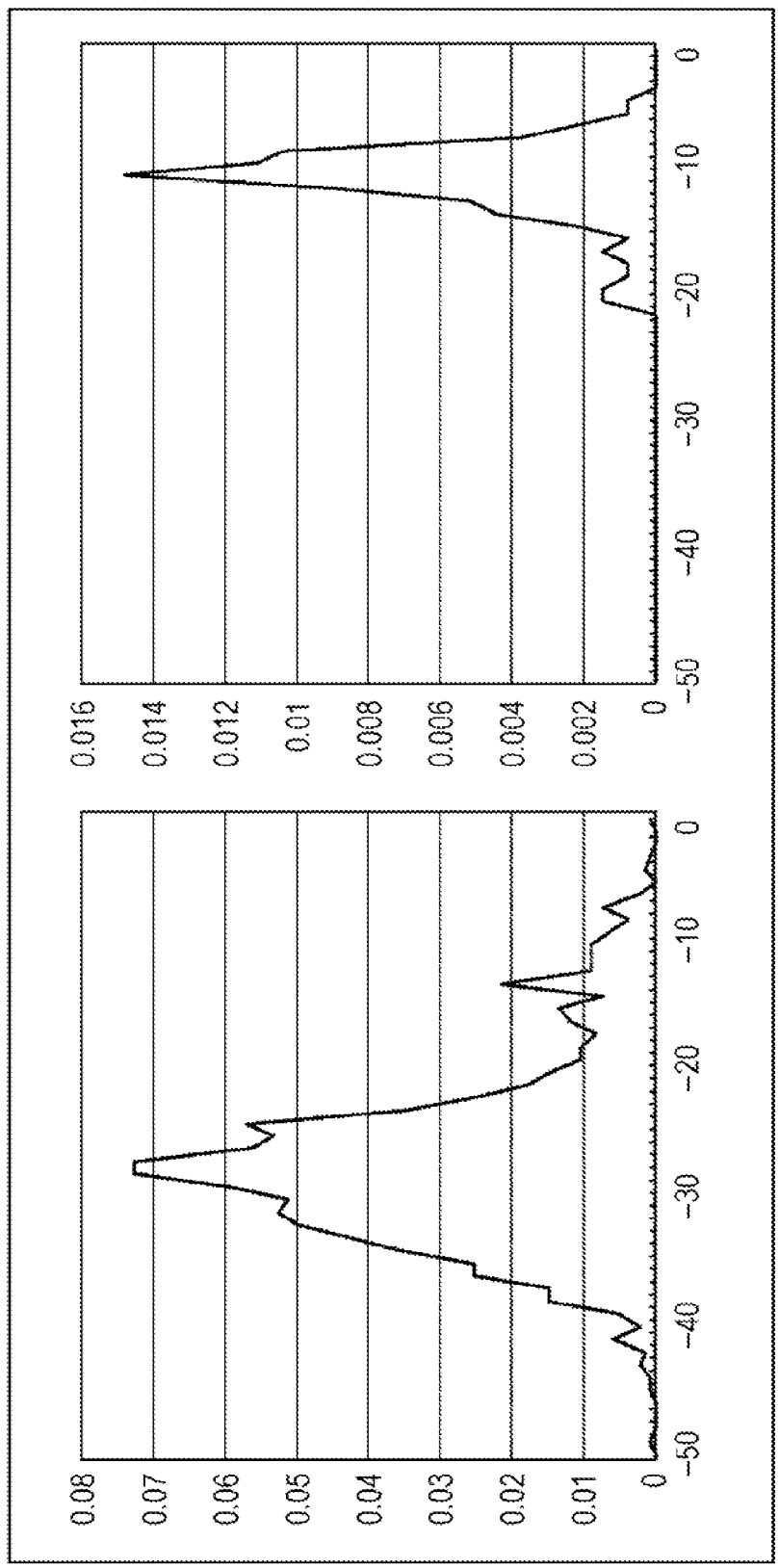
FIG. 9 includes diagrams illustrating probabilities of appearance of low-frequency maximum values.

Next, the threshold value pl_low of the low-frequency maximum values Pl(n) will be described. FIG. 9 includes diagrams illustrating a probability of appearance of low-frequency maximum values under conditions in which the user is on a train or on a bus or the user is walking. Note that, in the drawing, axes of abscissa denote the low-frequency maximum values (dB) of sounds serving as samples, and axes of ordinate denote a probability of appearance.

In FIG. 9, a probability of appearance of the ambient sound is shown on a left side in the drawing and a probability of appearance of the operation sound is shown on a right side in the drawing.

The low-frequency maximum values of the ambient sound are largely distributed in the vicinity of −28 dB as a center whereas the low-frequency maximum values of the operation sound are mostly distributed in the vicinity of −10 dB. That is, the low-frequency maximum values of the operation sound are distributed in portions corresponding to values larger than the low-frequency maximum values of the ambient sound. Using a difference between a statistical distribution of the high-frequency maximum values Pl(n) of the ambient sound and a statistical distribution of the high frequency maximum values Pl(n) of the operation sound, a prediction (discrimination) of the ambient sound or the operation sound is performed so that the frequency of the excess detection is reduced.

For example, when the operation sound is discriminated from the ambient sound, the linear discriminant analysis is used. When the linear discriminant analysis is performed and explanatory variates correspond to the low-frequency maximum values Pl(n) and object variates correspond to data of two groups of the ambient sound and the Operation sound, a discriminant shown in Expression (18) is obtained.

[Expression (18)]

$$zpl = pl(n) - pl\_low \quad (18)$$

For example, when the samples shown in FIG. 9 are used, 0.644 is obtained as a constant term pl_low. The constant term pl_low corresponds to a midpoint between a median point of the distribution of the ambient sound and a median point of the distribution of the operation sound shown in FIG. 9.

In Expression (18), when a discrimination point zpl is equal to or larger than 0, it is determined that the sound being processed corresponds to the operation sound whereas when the discrimination point zpl is smaller than 0, it is determined that the sound being processed is the ambient sound. The constant term pl_low of this discriminant is determined as the threshold value pl_low for the low-frequency maximum value and is recorded in the discrimination processor 68. Note that, as with the case of the threshold value ph_low described above, the insufficient detection and the excess detection may be optimized by changing the threshold value pl_low for the low-frequency maximum value.

Threshold Values rmsl_low(m) for Low-Frequency Effective Values

Next, the threshold values rmsl_low(m) of the low-frequency effective values rmsl(n, m) will be described.

Figure 10:
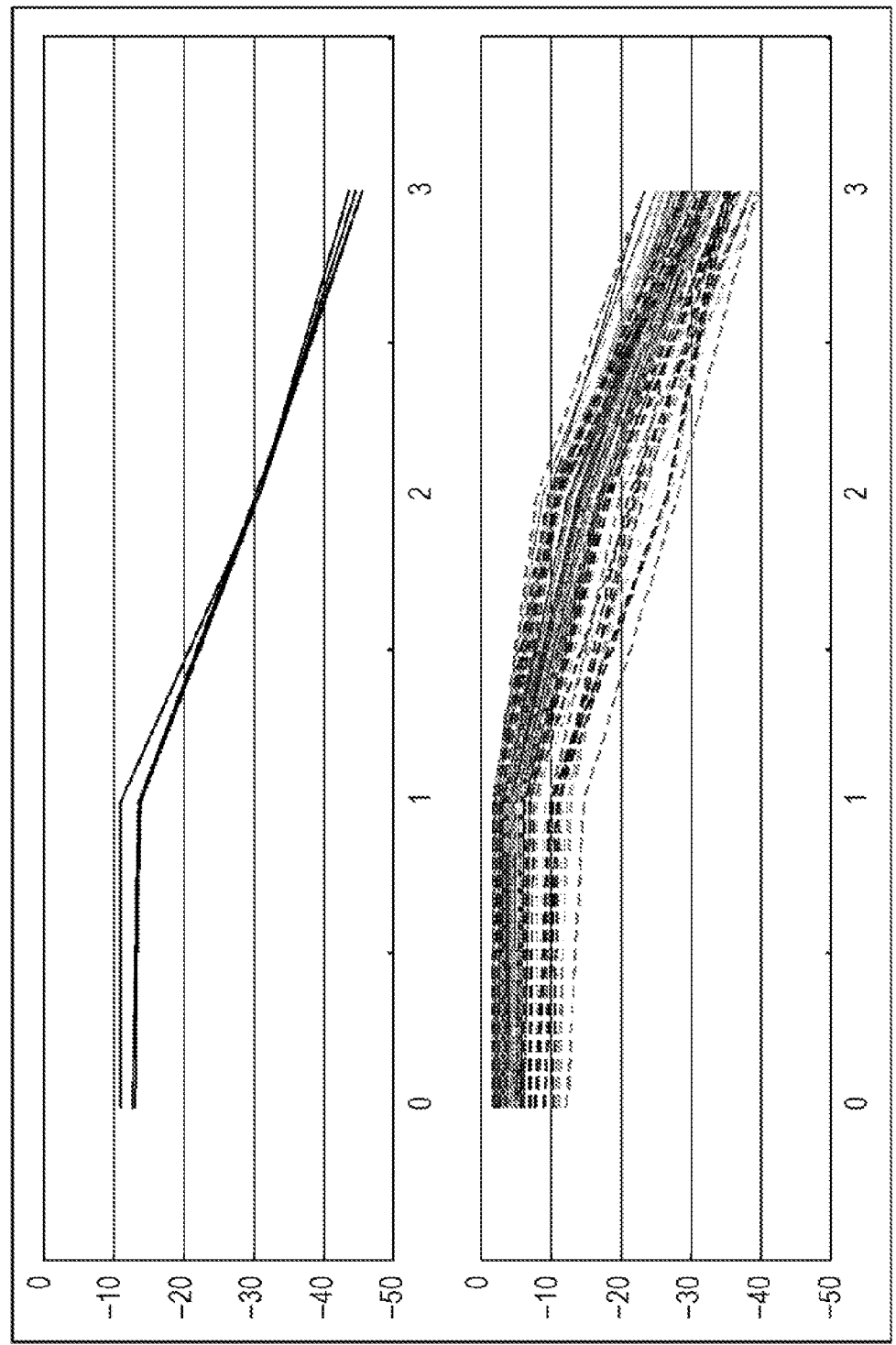
FIG. 10 includes diagrams illustrating distribution of low-frequency effective values.

FIG. 10 is a diagram illustrating the low-frequency effective values rmsl(n, m) under various conditions in which the user is on a train or on a bus or the user is walking. Note that, in the drawing, axes of abscissa denote sections LSm, that is, a variable m (where m=1, 2, ..., or 31) of the low-frequency effective values rmsl(n, m) and axes of ordinate denote the low-frequency effective values (dB) of the sections LSm.

In FIG. 10, low-frequency effective values of the ambient sound are shown on an upper side in the drawing and low-frequency effective values of the operation sound are shown on a lower side in the drawing. Furthermore, the low-frequency effective values shown in FIG. 10 correspond to low-frequency effective values of samples (sounds) which satisfy a condition in which the time index hi is equal to "n−hi_peak" described in step S51 of FIG. 5 where "hi_peak" is equal to 1791.

Therefore, the low-frequency effective values of the ambient sound and the operation sound are distributed in portions corresponding to large values when m is equal to 0. Furthermore, the low-frequency effective values of the operation sound are distributed in portions corresponding to large values in all the sections corresponding to m of 0 to 3.

As described above, the operation sound is characterized in that the low-frequency effective values are gradually reduced after the sound pickup unit 31 is directly tapped. On the other hand, in the low-frequency effective values of the ambient sound, the low-frequency effective values are steeply reduced in the sections corresponding to m of 2 and 3.

Using a difference between a statistical distribution of the low-frequency effective values of the ambient sound and a statistical distribution of the low-frequency effective values of the operation sound in the individual sections, a prediction (discrimination) of the ambient sound or the operation sound is performed so that the frequency of the excess detection is reduced.

For example, for the discrimination of the operation sound from the ambient sound, the linear discriminant analysis is used. When the linear discriminant analysis is performed and explanatory variates correspond to the low-frequency effective values rmsl(n, m) and object variates correspond to data of two groups of the ambient sound and the operation sound, an discriminant as denoted by Expression (19) is obtained.

[Expression (19)]

$$zrmsl(m) = rmsl(n, m) - rmsl\_low(m) \quad (19)$$

For example, when the samples shown in FIG. 10 are used, values shown in FIG. 11 are obtained as constant terms rmsl_low(m) for the variables m, that is, constant terms rmsl_low(0) to rmsl_low(3). Among the constant terms, the constant terms rmsl_low(0) and rmsl_low(1) are especially large values in accordance with the low-frequency effective values of the operation sound shown in FIG. 10.

In Expression (19), when discrimination points zrmsl(m) of all sections LS0 to LS3 are equal to or larger than 0, it is determined that a sound being processed corresponds to the operation sound whereas when at least one of the discrimination points zrmsl(m) of the sections LSm is smaller than 0, it is determined that the sound being processed is the ambient sound. The constant terms rmsl_low(m) of this discriminant are determined as the threshold values rmsl_low(m) of the low-frequency effective values and are recorded in the discrimination processor 68.

Note that insufficient detection and excess detection may be optimized by changing the threshold values rmsl_low(m) of the low-frequency effective values. However, since the number of threshold values (constant terms) is four, the change is difficult.

On the other hand, when the explanatory variates correspond to four-order low-frequency effective values rmsl(n, m) (where m=0, 1, 2, or 3) and the linear discriminant analysis is performed, a discriminant denoted by Expression (20) is obtained.

[Expression (20)]

$$zrmsl = \sum_{m=0}^{3} (a\_rmsl(m) \times rmsl(n, m)) + b\_rmsl \quad (20)$$

In Expression (20), "a_rmsl(m)" (where m=0, 1, 2, or 3) represents linear discriminant coefficients and "b_rmsl" represents a constant term of the linear discriminant. Then, when a discrimination point zrmsl is equal to or larger than 0, the sound being processed is determined to be the operation sound whereas when the discrimination point zrmsl is smaller than the discrimination point zrmsh, the sound being processed is determined to be the ambient sound.

In the discriminant of Expression (20), the insufficient detection and the excess detection may be more easily optimized by changing the constant term b_rmsl when compared with the discriminant of Expression (19).

When the constant term b_rmsl is determined as a threshold value, in step S56 of FIG. 5, a sum of products of the linear discriminant coefficients a_rmsl(m) and the low-frequency effective values rmsl(n, m) is compared with a threshold value (-b_rmsl) and discrimination of the operation sound is performed. Specifically, when the sum of the low-frequency effective values multiplied by the linear discriminant coefficients exceeds -b_rmsl, it is determined that the sound being processed is the ambient sound.

Furthermore, when the four-order low-frequency effective values rmsl(n, m) are converted into logarithmic, scales as represented by Expression (21), frequency of the insufficient detection and the excess detection may be further reduced.

[Expression (21)]

$$zrmsl = \sum_{m=0}^{3} (al\_rmsl(m) \times \log_{10}(rmsl(n, m))) + bl\_rmsl \quad (21)$$

Note that, in Expression (21), "al_rmsl(m)" (where m=0, 1, 2, or 3) represents the linear discriminant coefficients and "bl_rmsl" represents a constant term of the linear discriminant. Also in the discriminant of Expression (21), when a discrimination point zrmsl is equal to or larger than 0, it is determined that the generated sound is the operation sound whereas when the discrimination point zrmsl is smaller than 0, it is determined that the generated sound is the ambient sound.

Furthermore, in the discriminant of Expression (21), the insufficient detection and the excess detection may be more easily optimized by changing the constant term bl_rmsl. When the constant term bl_rmsl is determined as a threshold value, in step S56 of FIG. 5, a sum of products of the linear discriminant coefficients al_rmsl(m) and logarithmic values of the low-frequency effective values rmsl(n, m) to the base 10 is compared with the threshold value (-bl_rmsl) so that discrimination of the operation sound is performed. Specifically, when the sum of the products of the linear discriminant coefficients and the logarithmic values of the low-frequency effective values rmsl(n, m) exceeds -bl_rmsl, it is determined that the sound being processed is the ambient sound.

Furthermore, in order to optimize the insufficient detection and the excess detection, 32-order high-frequency effective values rmsl(n, m) (where m=0, 1, 2, ..., or 31) and four-order low-frequency effective values rmsl(n, m) (where m=0, 1, 2, or 3) are determined as the explanatory variates and the linear discriminant analysis may be performed. In this case, the discriminant represented by Expression (22) is obtained.

[Expression (22)]

$$zrms = \sum_{m=0}^{31} (al\_rmsh(m) \times \log_{10}(rmsh(n, m))) + \sum_{m=0}^{3} (al\_rmsl(m) \times \log_{10}(rmsl(n, m))) + bl\_rms \quad (22)$$

In Expression (22), "al_rmsh(m)" (where m=0, 1, 2, ..., or 31) and "al_rmsl(m)" (where m=0, 1, 2, or 3) represent linear discriminant coefficients and "b_rmsl" represents a constant term of the linear discriminant. Also in the discriminant of Expression (22), when a discrimination point zrms is equal to or larger than 0, the sound being processed is determined to be the operation sound whereas when the discrimination point zrms is smaller than 0, the sound being processed is determined to be the ambient sound.

In the discriminant of Expression (22), the insufficient detection and the excess detection may be more easily optimized by changing the constant term bl_rms. When the bl_rms is determined as a threshold value, in step S56 of FIG. 5, a sum of products of the linear discriminant coefficients al_rmsh(m) and logarithmic values of the high-frequency effective values rmsh(n, m) to the base 10 and a sum of products of the linear discriminant coefficients al_rmsl(m) and logarithmic values of the low-frequency effective values rmsl(n, m) to the base 10 are obtained. Then, a sum of the obtained two sums is compared with a threshold value (-bl_rms) so that discrimination of the operation sound is performed. Specifically, when the sum of the obtained two sums exceeds -bl_rms, it is determined that the sound being processed is the ambient sound. In this case, balance between the low-frequency effective values and the high-frequency effective values are taken into consideration in the discrimination of the sound.

Note that, one of the discriminants among Expression (19) to Expression (22) to be used is selected in accordance with balance among the calculation amount, the insufficient detection, and the excess detection.

Threshold Value zcr_high for Zero-Cross Values

Figure 12:
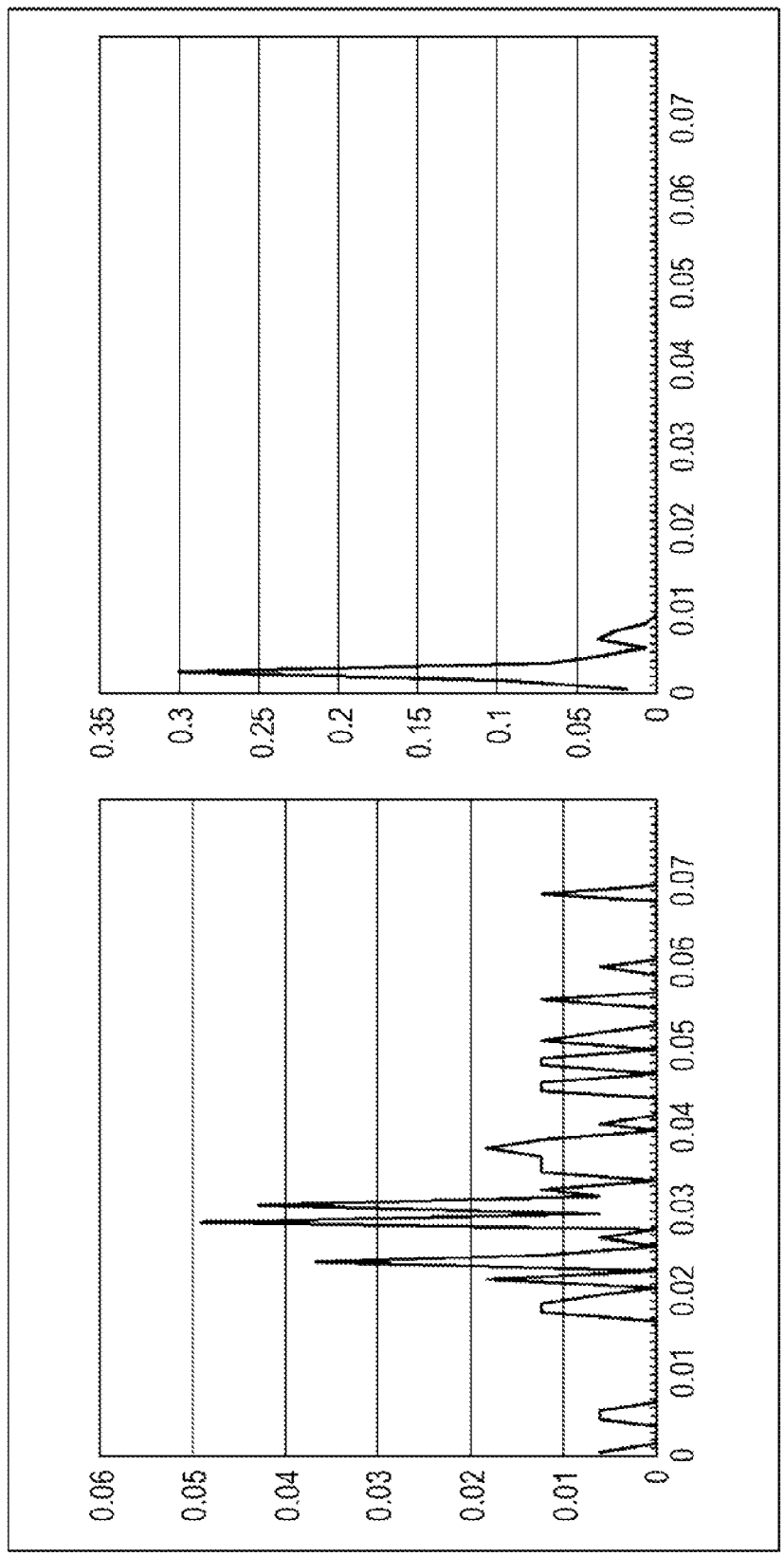
FIG. 12 includes diagrams illustrating probabilities of appearance of zero-cross values.

Finally, a threshold value zcr_high of the zero-cross values zcr(n) will be described. FIG. 12 includes diagrams illustrating a probability of appearance of zero-cross values under conditions when the user is on a train or on a bus or the user is walking. Note that, in the drawing, axes of abscissa denote zero-cross values of sounds serving as samples and axes of ordinate denote a probability of appearance.

In FIG. 12, a probability of appearance of the ambient sound is shown on a left side in the drawing, and a probability of appearance of the operation sound is shown on a right side in the drawing.

Zero-cross values of the ambient sound are largely distributed in portions corresponding to comparatively small values whereas zero-cross values of the operation sound are mostly distributed in portions near 0 when compared with the zero-cross values of the ambient sound. Using a difference between a statistical distribution of the zero-cross values of the ambient sound and a statistical distribution of the zero-cross values of the operation sound, a prediction (discrimination) of the ambient sound or the operation sound is performed so that the frequency of the excess detection is reduced.

For example, when the operation sound is discriminated from the ambient sound, the linear discriminant analysis is used. When the linear discriminant analysis is performed and explanatory variates correspond to the zero-cross values zcr(n) and object variates correspond to data of two groups of the ambient sound and the operation sound, an discriminant as denoted by Expression (23) is obtained.

[Expression (23)]

$$zzcr = -zcr(n) + zcr\_high \quad (23)$$

For example, when the samples shown in FIG. 12 are used, 0.013 is obtained as a constant term zcr_high. The constant term zcr_high corresponds to a midpoint between a median point of the distribution of the ambient sound and a median point of the distribution of the operation sound shown in FIG. 12.

In Expression (23), when a discrimination point zzcr is equal to or larger than 0, it is determined that the sound being processed corresponds to the operation sound whereas when the discrimination point zzcr is smaller than 0, it is determined that the sound being processed is the ambient sound. The constant term zcr_high of this discriminant is determined as the threshold value zcr_high of the zero-cross values and is recorded in the discrimination processor 68. Note that the insufficient detection and the excess detection may be optimized also by changing the threshold value zcr_high of the zero-cross values.

As described above, since a discrimination boundary is obtained and the discrimination boundary is used as the threshold value, the operation sound generated when the sound pickup unit 31 is directly tapped is discriminated from the ambient sound generated when the sound pickup unit 31 is tapped.

Furthermore, in the forgoing description, a case where a discrimination function (discriminant) is generated using the linear discriminant analysis is generated has been described. However, non-linear discriminant may be used, and alternatively, linear SVM (Support Vector Machine) or non-linear SVM may be used. A method for generating the discrimination function for obtaining a threshold value and feature amounts used for generation of the discrimination function are determined in accordance with balance among discrimination functions such as the insufficient detection and the excess detection, the calculation amount, and the like.

Furthermore, the case where the operation sound and the ambient sound are collected under various conditions in which the user is on a train or a bus or the user is walking before the discriminant analysis is performed has been described. However, in order to improve the discrimination function, the ambient sounds may be limited to sounds similar to the operation sound. In this case, for example, only ambient sounds corresponding to discrimination points of approximately 0 are determined to be sounds similar to the operation sound and are used as learning data.

Furthermore, in the foregoing description, as an example of a device which determines whether a sound collected by the sound pickup unit 31 is operation sound and performs an operation in accordance with a result of the determination, the reproducing apparatus 11 which is a mobile music player has been described. Alternatively, an IC recorder or the like may be used.

A series of the processes described above may be executed by hardware or software. When the series of the processes are to be executed by software, programs included in the software are installed from a program recording medium in a computer embedded in dedicated hardware or a general personal computer, for example, capable of executing various functions by installing various programs.

Figure 13:
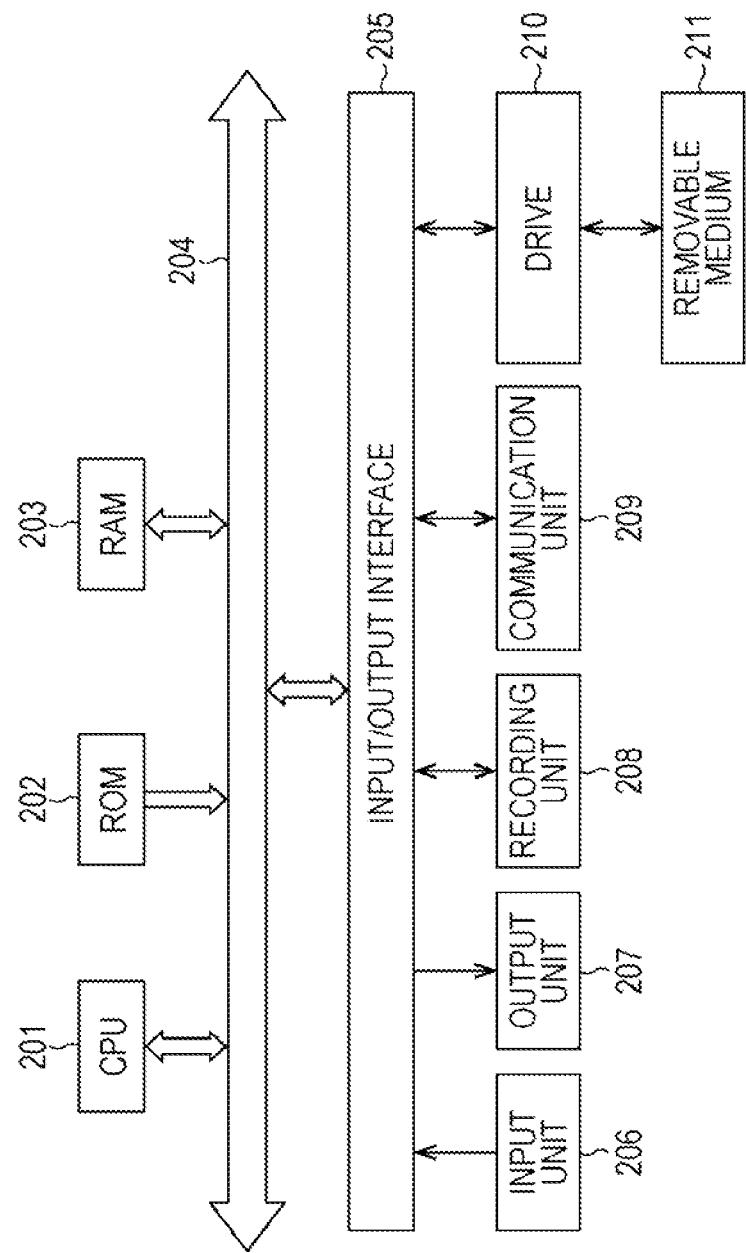
FIG. 13 is a diagram illustrating a configuration of a computer.

FIG. 13 is a block diagram illustrating a hardware configuration of a computer which executes the series of processes by programs.

In the computer, a CPU (Central Processing Unit) 201, a ROM (Read Only Memory) 202, and a RAM (Random Access Memory) 203 are connected to one another through a bus 204.

Furthermore, an input/output interface 205 is connected, to the bus 204. An input unit 206 including a keyboard, a mouse, and a microphone, an output unit 207 including a display and a speaker, a recording unit 208 including a hard disk and a nonvolatile memory, a communication unit 209 including a network interface, a drive 210 which drives a removable medium 211 such as a magnetic disk, an optical disc, a magneto-optical disc, or a semiconductor memory are connected to the input/output interface 205.

In the computer configured as described above, the CPU 201 loads the programs recorded in the recording unit 208 into the RAM 203 through the input/output interface 205 and the bus 204 and executes the programs whereby the series of processes described above is performed.

The programs to be executed by the computer (CPU201) are provided by being recorded in the removable medium 211 which is a package medium such as a magnetic disk (including a flexible disk), an optical disc (CD-ROM (Compact Disc-Read Only Memory), a DVD (Digital Versatile Disc), or the like), an optical magnetic disc, or a semiconductor memory or provided through a wired or wireless transmission medium such as a local area network, the Internet, or digital satellite broadcasting.

Then, the programs may be installed in the recording unit 208 through the input/output interface 205 by installing the removable medium 211 into the drive 210. Furthermore, the programs may be received by the communication unit 209 through the wired or wireless transmission medium and installed in the recording unit 208. Alternatively, the programs may be installed in the ROM 202 or the recording unit 208 in advance.

Note that the programs to be executed by the computer may be processed in a time series manner in an order described in this specification, may be processed in parallel, or may be processed at a required timing such as a timing when a calling process is performed.

Note that, the embodiment of the present invention is not limited to the embodiment described above and various modifications may be made without departing from the scope of the invention.

REFERENCE SIGNS LIST 11 reproducing apparatus
21 earphones
22 body
31-1, 31-2, 31 sound pickup unit
34-1, 34-2, 34 discrimination unit
35 controller
39 reproduction controller 61 low-pass filter processor
62 low-frequency maximum-value calculation unit
63 low-frequency effective-value calculation unit
64 high-pass filter processor
65 high-frequency maximum-value calculation unit
66 high-frequency effective-value calculation unit
67 zero-cross-value calculation unit
68 discrimination processor

The invention claimed is:

1. A control device comprising:
a sound pickup unit which collects a surrounding sound;
discrimination means for:
determining whether the sound pickup unit has been tapped using a maximum value and effective values of the sound collected by the sound pickup unit,
determining whether the effective values in a plurality of sections obtained by dividing a high-frequency component in a time direction are equal to or smaller than third threshold values determined for individual sections and determines that the sound pickup unit has not been tapped when an effective value of at least one of the sections of the high-frequency component exceeds the third threshold value,
determining whether effective values in a plurality of sections obtained by dividing a low-frequency component in a time direction are equal to or smaller than fourth threshold values determined for individual sections and determines that the sound pickup unit has not been tapped when an effective value of at least one of the sections of the low-frequency component is smaller than the fourth threshold value; and
execution means for executing a predetermined process when it is determined that the sound pickup unit has been tapped.

2. The control device according to claim 1, wherein the execution means specifies the number of times the sound pickup unit has been tapped within a predetermined period of time in accordance with a result of the determination performed by the discrimination means and executes a process determined in accordance with the specified number.

3. The control device according to claim 1, wherein the execution means executes a process determined by the sound pickup unit which has been tapped.

4. The control device according to claim 1, wherein the discrimination means determines whether the sound pickup unit has been tapped in accordance with a result of a threshold-value process performed on the maximum value and a result of a threshold-value process performed on the effective values.

5. The control device according to claim 4, wherein a threshold value used in the threshold-value process performed on the maximum value and a threshold value used in the threshold-value process performed on the effective values are determined by discriminant analysis or Support Vector Machine in advance.

6. The control device according to claim 4, wherein the discrimination means determines that the sound pickup unit has not been tapped when the maximum value of high-frequency components of frequencies higher than a predetermined frequency of the sound is smaller than a first threshold value and determines that the sound pickup unit has not been tapped when the maximum value of low-frequency components of frequencies is lower than the high frequency component of the sound.

7. The control device according to claim 1, wherein the sections of the high-frequency component have different lengths, and the sections of the low frequency component have different lengths.

8. The control device according to claim 1 or claim 7, wherein the discrimination means determines whether an, absolute value of the high-frequency component at a specific position in the time direction becomes maximum and determines that the sound pickup unit has not been tapped when the absolute value at the specific position does not become maximum.

9. The control device according to claim 8, wherein the discrimination means determines whether a zero-cross value of the sound is equal to or smaller than a fifth threshold value and determines that the sound pickup unit has not been tapped when the zero-cross value exceeds the fifth threshold value.

10. The control device according to claim 6, wherein the discrimination means determines whether a linear sum of effective values of sections of the high frequency component in the time direction is equal to or smaller than a sixth threshold value and determines that the sound pickup unit has not been tapped when the linear sum exceeds the sixth threshold value.

11. The control device according to claim 6, wherein the discrimination means determines whether a linear sum of effective values of sections of the high frequency component in the time direction is equal to or smaller than a seventh threshold value and determines that the sound pickup unit has not been tapped when the linear sum exceeds the seventh threshold value.

12. The control device according to claim 6, wherein the discrimination means determines whether a linear sum of effective values of sections of the low frequency component in the time direction is equal to or smaller than an eighth threshold value and determines that the sound pickup unit has not been tapped when the linear sum exceeds the eighth threshold value.

13. The control device according to claim 6, wherein the discrimination means determines whether a linear sum of effective values of sections of the low frequency component in the time direction is equal to or smaller than a ninth threshold value and determines that the sound pickup unit has not been tapped when the linear sum exceeds the ninth threshold value.

14. The control device according to claim 6, wherein the discrimination means determines whether a sum of a linear sum of logarithmic values of effective values of sections of the high-frequency component in the time direction and a linear sum of logarithmic values of effective values of sections of the low-frequency component in the time direction is equal to or smaller than a tenth threshold value and determines that the sound pickup unit has not been tapped when the sum exceeds the tenth threshold value.

15. The control device according to claim 1, wherein the sound pickup unit is included in earphones.

16. A control method of a control device including:
a sound pickup unit which collects a surrounding sound,
discrimination means, for determining whether the sound pickup unit has been tapped using a maximum value and effective values of the sound collected by the sound pickup unit and,
determining whether the effective values in a plurality of sections obtained by dividing a high-frequency component in a time direction are equal to or smaller than third threshold values determined for individual sections and determines that the sound pickup unit has not been tapped when an effective value of at least one of the sections of the high-frequency component exceeds the third threshold value, determining whether effective values in a plurality of sections obtained by dividing a low-frequency component in a time direction are equal to or smaller than fourth threshold values determined for individual sections and determines that the sound pickup unit has not been tapped when an effective value of at least one of the sections of the low-frequency component is smaller than the fourth threshold value; and execution means for executing a predetermined process when it is determined that the sound pickup unit has been tapped, wherein the sound pickup unit collects the sound, the discrimination means determines whether the sound pickup unit has been tapped, and the execution means executes a predetermined process in accordance with a result of the determination performed by the discrimination means.

17. A non-transitory computer readable medium storing instructions, which when executed by a processor causes the computer readable medium to execute a process comprising the steps of:

collecting a surrounding sound using a sound pickup unit;

determining, by a discrimination means, whether the sound pickup unit has been tapped using a maximum value and effective values of the sound collected by the sound pickup unit; and determining whether the effective values in a plurality of sections obtained by dividing a high-frequency component in a time direction are equal to or smaller than third threshold values determined for individual sections and determines that the sound pickup unit has not been tapped when an effective value of at least one of the sections of the high-frequency component exceeds the third threshold value, determining whether effective values in a plurality of sections obtained by dividing a low-frequency component in a time direction are equal to or smaller than fourth threshold values determined for individual sections and determines that the sound pickup unit has not been tapped when an effective value of at least one of the sections of the low-frequency component is smaller than the fourth threshold value; and executing a predetermined process when it is determined that the sound pickup unit has been tapped.

* * * * *